United States Patent
Wani et al.

(10) Patent No.: US 10,796,394 B2
(45) Date of Patent: Oct. 6, 2020

(54) ESTIMATION OF DAMAGE PREVENTION WITH BUILDING RETROFIT

(71) Applicant: One Concern, Inc., Palo Alto, CA (US)

(72) Inventors: Ahmad Wani, Menlo Park, CA (US); Nicole Hu, Mountain View, CA (US); Timothy Frank, Stanford, CA (US)

(73) Assignee: ONE CONCERN, INC., Menlo Park, CA (US)

( * ) Notice: Subject to any disclaimer, the term of this patent is extended or adjusted under 35 U.S.C. 154(b) by 0 days.

(21) Appl. No.: 15/969,151

(22) Filed: May 2, 2018

(65) Prior Publication Data

US 2018/0336652 A1 Nov. 22, 2018

Related U.S. Application Data

(60) Provisional application No. 62/506,755, filed on May 16, 2017.

(51) Int. Cl.
G06Q 50/26 (2012.01)
G06Q 10/06 (2012.01)
(Continued)

(52) U.S. Cl.
CPC .......... *G06Q 50/265* (2013.01); *G06F 30/13* (2020.01); *G06F 30/20* (2020.01); *G06N 20/00* (2019.01);
(Continued)

(58) Field of Classification Search
CPC .......... G06Q 50/265; G06Q 10/06375; G06N 20/00; G06F 17/50; G06F 17/5004; G06F 17/5009
See application file for complete search history.

(56) References Cited

U.S. PATENT DOCUMENTS

2005/0049962 A1 3/2005 Porter et al.
2008/0208721 A1 8/2008 Bertogg
(Continued)

FOREIGN PATENT DOCUMENTS

CN 105654414 A 6/2016
CN 105809266 A 7/2016
(Continued)

OTHER PUBLICATIONS

Zhou, Youwei, et al. "Seismic risk assessment of retrofitted transportation systems." Proceedings of the 13 th World Conference on Earthquake Engineering. 2004. (Year: 2004).*
(Continued)

*Primary Examiner* — Omar F Fernandez Rivas
*Assistant Examiner* — Joshua E. Jensen
(74) *Attorney, Agent, or Firm* — Schwegman Lundberg & Woessner, P.A.

(57) ABSTRACT

Methods, systems, and computer programs are presented for estimating the differences, due to building retrofitting, in damage caused to a building by an earthquake. One method includes operations for accessing a database to retrieve current fragility functions for predicting structural damage to a building, and for identifying features of the building. The method further includes operations for identifying a retrofit measure having a cost to improve the building structure, and for estimating a first building damage after a simulated earthquake utilizing a machine-learning program and the current fragility functions. The method further includes operations for determining new fragility functions for the building based on the retrofit measure and the current fragility functions, for estimating a second building damage after the simulated earthquake utilizing the new fragility functions, and for determining the difference in damage (Continued)

resulting from the retrofit measure based on the first and the second building damage.

20 Claims, 28 Drawing Sheets

(51) Int. Cl.
  *G06N 20/00*    (2019.01)
  *G06N 20/10*    (2019.01)
  *G06F 30/13*    (2020.01)
  *G06F 30/20*    (2020.01)
  *G06Q 40/08*    (2012.01)
  *G06N 3/02*    (2006.01)
  *G06N 20/20*    (2019.01)
  *G06N 5/00*    (2006.01)

(52) U.S. Cl.
  CPC ....... *G06N 20/10* (2019.01); *G06Q 10/06375* (2013.01); *G06N 3/02* (2013.01); *G06N 5/003* (2013.01); *G06N 20/20* (2019.01); *G06Q 40/08* (2013.01)

(56) References Cited

U.S. PATENT DOCUMENTS

| | | | |
|---|---|---|---|
| 2013/0054200 A1 | | 2/2013 | Kumarasena |
| 2018/0106696 A1* | | 4/2018 | McClure ................. G01M 7/02 |

FOREIGN PATENT DOCUMENTS

| | | | | | |
|---|---|---|---|---|---|
| JP | 2003132296 | A | | 5/2003 | |
| JP | 2003147970 | | * | 5/2003 | ............. G06F 17/50 |
| JP | 2014129688 | A | | 7/2014 | |
| JP | 2018195310 | | | 12/2018 | |
| JP | 6499788 | B2 | | 3/2019 | |
| JP | 2019108798 | A | | 7/2019 | |
| WO | 2018213012 | | | 11/2018 | |

OTHER PUBLICATIONS

Goulet, Christine A., et al. "Evaluation of the seismic performance of a code-conforming reinforced-concrete frame building—from seismic hazard to collapse safety and economic losses." Earthquake Engineering & Structural Dynamics 36.13 (2007): 1973-1997. (Year: 2007).*

Zhang, Jian, and Yili Huo. "Evaluating effectiveness and optimum design of isolation devices for highway bridges using the fragility function method." Engineering Structures 31.8 (2009): 1648-1660. (Year: 2009).*

Padgett, Jamie E., and Reginald DesRoches. "Methodology for the development of analytical fragility curves for retrofitted bridges." Earthquake Engineering & Structural Dynamics 37.8 (2008): 1157-1174. (Year: 2008).*

Wani, Ahmad, Nicole Hu, and Yawar Aziz. "Will I Feel It? Using Performance Based Earthquake Engineering to predict the extent of earthquake damage in California homes." (Year: 2014).*

Hueste, Mary Beth D., and Jong-Wha Bai. "Seismic retrofit of a reinforced concrete flat-slab structure: Part II—Seismic fragility analysis." Engineering Structures 29.6 (2007): 1178-1188. (Year: 2007).*

"International Application Serial No. PCT/US2018/030841, International Search Report dated Jul. 19, 2018", 2 pgs.

"International Application Serial No. PCT/US2018/030841, Written Opinion dated Jul. 19, 2018", 3 pgs.

"Japanese Application Serial No. 2018-093895, Office Action dated Nov. 6, 2018", W O English Translation, 3 pgs.

"Japanese Application Serial No. 2018-093895, Response filed Feb. 6, 2019Office Action dated Nov. 6, 2018", w/English Claims, 11 pgs.

"International Application Serial No. PCT/US2018/030841, International Preliminary Report on Patentability dated Nov. 28, 2019", 5 pgs.

"Japanese Application Serial No. 2019-048409, Notification of Reasons for Refusal dated Jul. 1, 2020", 6 pgs.

"Japanese Application Serial No. 2019-048409, Response filed Aug. 17, 2020 to Notification of Reasons for Refusal dated Jul. 1, 2020", w/ English Claims, 10 pgs.

* cited by examiner

Your experience of the earthquake                    202

Shaking Strength:
How would you best describe the shaking?

[ Please select ... ▼ ]

Shaking Duration (seconds):
About how many seconds did the shaking last?

[                              ]

How did you react:

[ Please select ... ▼ ]

How did you respond:

[ Please select ... ▼ ]

Stand or Walk:
Was it difficult to stand and/or walk?

[ Please select ... ▼ ]

Was there any damage to the building?
Check all that apply.
                                                     204
☐ No Damage
☐ Hairline cracks in walls
☐ A few large cracks in walls
☑ Many large cracks in walls
☐ Ceiling tiles or lightning fixtures fell
☐ Cracks in chimney
☑ One or several cracked windows
☐ Many windows cracked or some broken out
☐ Masonry fell from block or brick wall(s)

FIG. 2B

|  Actual BDI | Predicted BDI | | | |
|---|---|---|---|---|
| | 0 | 1 | 2 | 3 |
| 0 | 172 | 23 | 0 | 0 |
| 1 | 64 | 137 | 2 | 0 |
| 2 | 3 | 7 | 97 | 0 |
| 3 | 0 | 0 | 1 | 6 |

FIG. 12

| Algorithm | Training | | Testing | |
|---|---|---|---|---|
| | F-Score | Error | F-Score | Error |
| Random Forest | 0.953 | 1.57% | 0.877 | 17.20% |
| Support Vector Machines | 0.834 | 19.55% | 0.879 | 17.03% |
| Neural Networks | 0.790 | 22.80% | 0.815 | 21.50% |

FIG. 13

2202 — HOUSEHOLD INCOME LEVEL

| | <=10k | 10k-30k | 30k-50k | 50k-100k | >=100k |
|---|---|---|---|---|---|
| BDI3 | 31 | 118 | 131 | 141 | 157 |
| BDI2 | 1456 | 6406 | 6404 | 11986 | 12694 |
| BDI1 | 283 | 1058 | 1225 | 2583 | 2665 |
| BDI0 | 37 | 259 | 318 | 460 | 647 |

2208 — AGE GROUP

| | CHILDREN (<=16) | ADULT (16-65) | SENIOR (>65) |
|---|---|---|---|
| BDI3 | 268 | 937 | 235 |
| BDI2 | 26568 | 68364 | 16112 |
| BDI1 | 3892 | 12448 | 5489 |
| BDI0 | 152 | 2643 | 258 |

2204 — BUILDING AGE

| | BEFORE 1940 | 1940-1959 | 1960-1979 | 1980-1999 | AFTER 1999 |
|---|---|---|---|---|---|
| BDI3 | 96 : 14% | 247 : 36% | 121 : 18% | 141 : 25% | 43 : 6% |
| BDI2 | 3537 : 8% | 8364 : 20% | 14458 : 34% | 10655 : 25% | 5676 : 13% |
| BDI1 | 1382 : 15% | 1458 : 16% | 3632 : 40% | 1802 : 20% | 802 : 9% |
| BDI0 | 319 : 14% | 307 : 13% | 806 : 35% | 662 : 29% | 213 : 9% |

2206 — BUILDING TYPE

| | BDI3 | BDI2 | BDI1 | BDI0 |
|---|---|---|---|---|
| RESIDENTIAL | 547 | 35455 | 8037 | 2219 |
| COMMERCIAL | 60 | 1925 | 518 | 115 |
| GOVERNMENT | 24 | 627 | 232 | 55 |

2210 — RESIDENT POPULATION

| | BDI3 | BDI2 | BDI1 | BDI0 |
|---|---|---|---|---|
| DAY | 561 | 36441 | 7231 | 1640 |
| NIGHT | 1359 | 106002 | 18981 | 5957 |
| 5PM COMMUTERS | 560 | 45442 | 7132 | 1487 |

FIG. 22

Map Overlay Detail
for Special Building

ACME Insurance Hospital    X

2300

12345 Main Street
Big City, California

Most Probable Damage
0

Damage Confidence Levels

| BDI 3 | BDI 2 | BDI 1 | BDI 0 |
|---|---|---|---|
| 0 | 0 | 29 | 71 |

FIG. 23

Prediction Results:
LATITUDE: 37.785
LONGITUDE: -122
PRICE(HOME): 1,000,000
PRICE(CONTENTS): 100,000
SIZE: 2000
AGE: 1000

Results

Home EAL mean : 8220
Home EAL stdev : 7400
Contents EAL mean: 634
Contents EAL stdev: 574

| Feature | Sa 2475 | Sa 435 | Sa 50 | Sa 20 |
|---|---|---|---|---|
| DCN | 3 | 2 | 1 | 1 |
| Home loss mean | 26000 | 37500 | 433 | 433 |
| Home loss stdev | 129000 | 58700 | 5000 | 5000 |
| Contents loss mean | 20100 | 2990 | 30.1 | 30.1 |
| Contents loss stdev | 10200 | 4650 | 380 | 380 |
| Recovery time mean | 39 | 11 | 1 | 1 |
| Recovery time stdev | 48 | 19 | 2 | 2 |

Prediction form
PLEASE ENTER YOUR DETAILS
Latitude
Longitude
Price of home in ($)
Price of contents in ($)
Size of home (in sq feet)
Age of home (in years)

PREDICT NOW

WILL I FEEL IT?

W.I.F.I. INDIVIDUAL HOME USER COMMUNITY PLANNER PROJECT DETAILS ABOUT US

FIG. 24

ESTIMATION OF DAMAGE PREVENTION WITH BUILDING RETROFIT

CLAIM OF PRIORITY

This application claims priority from U.S. Provisional Patent Application No. 62/506,755, filed May 16, 2017, and entitled "Estimation of Damage Prevention with Building Retrofit." This provisional application is herein incorporated by reference in its entirety.

TECHNICAL FIELD

The subject matter disclosed herein generally relates to the processing of data. For example, the present disclosure addresses systems and methods to predict the extent of structural damage caused by natural phenomena (e.g., an earthquake) using performance-based engineering and machine learning.

BACKGROUND

Natural phenomena, such as earthquakes, flooding, and fires, may cause significant damage to life and property. Predicting the extent of such damage may assist in prioritizing emergency services to those most affected by the earthquakes, flooding, and fires.

BRIEF DESCRIPTION OF THE DRAWINGS

Various ones of the appended drawings merely illustrate example embodiments of the present disclosure and cannot be considered as limiting its scope.

FIG. 1 is a network diagram, according to some example embodiments, illustrating a network environment suitable for predicting structural damage caused by phenomena such as fire, earthquake, water, wind, or the like.

FIGS. 2A-2B show example embodiments of screenshots of an example graphical user interface (GUI) of selected "Did You Feel It" (DYFI) questions provided by the United States Geological Survey (USGS) website.

FIG. 12 shows a confusion matrix, according to an example embodiment, for predictions of damage for 512 testing points.

FIG. 13 shows a performance comparison of algorithms in accordance with some example embodiments.

FIG. 22 illustrates several damage tables by demographic, according to some example embodiments.

FIG. 23 illustrates the detail provided for a special building, according to some example embodiments.

FIG. 24 shows an example embodiment of a screenshot of a GUI accessible via a website to enter data regarding a building structure (e.g., a dwelling).

DETAILED DESCRIPTION

Figure 1:
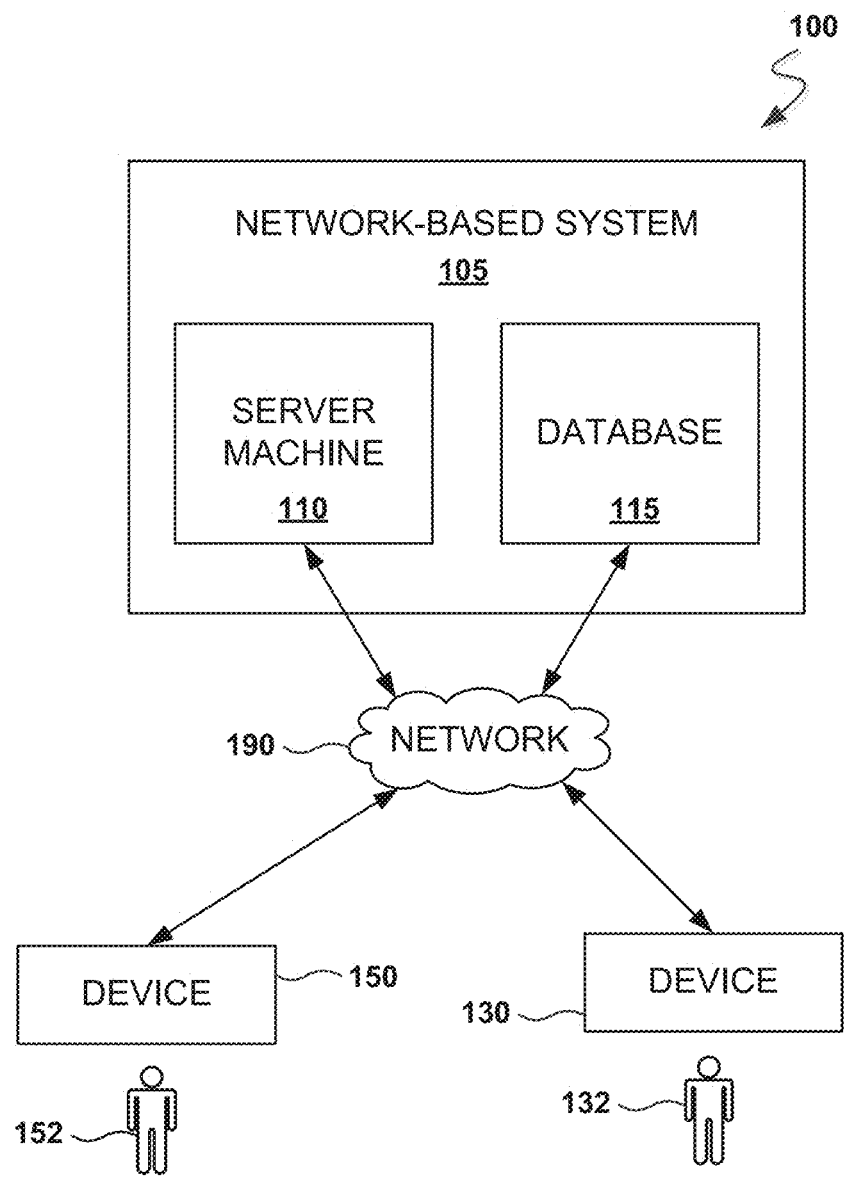

Example methods, systems, and computer programs are directed to estimating the differences, due to building retrofitting, in damage caused to buildings by an earthquake. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Predicting the scale and scope of damage as quickly as possible following an earthquake is beneficial in coordinating local emergency response efforts; implementing shelter, food, and medical plans; and requesting assistance from the state and federal levels. Additionally, estimating the damage and economic losses of individual homes is beneficial in assessing household risk and establishing insurance rates. Example embodiments described herein apply machine learning to predict damage after a disaster and estimate losses. The machine learning techniques may be combined with Performance Based Earthquake Engineering to predict damage. Using features known to influence how earthquakes affect structures (e.g., type of structure, amount of shaking, soil characteristics, structural parameters, etc.), extensive data may be collected from multiple sources, and substantial preprocessing techniques are implemented in example embodiments.

Pre-calculated damage states of thousands of homes from past earthquakes (e.g., stored in one or more databases) may serve as a training set, and machine-learning techniques (e.g., Support Vector Machines (SVM), random forest, neural networks, or the like) are used to develop an application that may estimate damage to building structures (e.g., single-family homes) in a geographical area (e.g., the state of California). In some example embodiments, damage assessment may be estimated quickly after an earthquake, including damage summary at the city-block level.

Government officials are often confronted with the idea of retrofitting buildings in their jurisdictions. However, spending money on prevention is often a difficult goal, and especially if the benefit of retrofitting is difficult to evaluate. Embodiments presented herein provide tools to government officials to perform cost/benefit analysis for retrofitting. Further, embodiments provide the ability to identify buildings where the benefit of retrofitting would be highest. For example, retrofitting some buildings may not improve the resilience of the buildings during an earthquake, but some other buildings (e.g., older buildings, buildings made with certain materials, or buildings in areas with weak soil) may greatly benefit from retrofitting measures.

The tools provided analyze the potential damage to buildings after an earthquake, and the consequences of retrofitting buildings before an earthquake. The estimated damages inflicted on a building, with and without retrofitting, are compared to identify the benefit of the retrofit measures. Additionally, a variety of retrofitting measures are available, and analysis is made for each of the different options for retrofitting to identify the return on investment of the different retrofit options.

Methods presented herein provide for calculating the damage to a building in its current state if a simulated earthquake takes place. In addition, the method also calculates the damage to the building if the building is retrofitted, and then a comparison of the different damages is performed to determine the value of the retrofit against the potential earthquake. In addition, the damage comparison is performed for a plurality of simulations for different earthquakes in different areas and of different magnitudes. The aggregated data for all the damage differences is analyzed to provide a single representative value that identifies the benefit of the retrofit.

In addition, another option is provided to identify which buildings in the region are most susceptible to damage (e.g., at high risk of collapsing after an earthquake). The method then analyzes possible retrofits for the high-risk buildings in order to perform the cost/benefit analysis for the retrofits.

One general aspect includes a method including operations for accessing, using one or more processors of a computer device, a database to retrieve current fragility functions for predicting structural damage to a building, and for identifying features of the building. The method also includes operations for identifying a retrofit measure to improve a structure of the building, the retrofit measure being associated with a cost; estimating, by the one or more processors, a first damage to the building after a simulated earthquake utilizing a machine-learning program and the current fragility functions; and determining, by the one or more processors, new fragility functions for the building based on the retrofit measure and the current fragility functions. The method further includes operations for estimating, by the one or more processors, a second damage to the building after the simulated earthquake utilizing the machine-learning program and the new fragility functions; and determining, by the one or more processors, a difference in damage resulting from the retrofit measure based on the first damage and the second damage.

One general aspect includes a system including a memory having instructions and one or more computer processors. The instructions, when executed by the one or more computer processors, cause the one or more computer processors to perform operations including: accessing, using one or more processors of a computer device, a database to retrieve current fragility functions for predicting structural damage to a building; identifying features of the building; identifying a retrofit measure to improve a structure of the building, the retrofit measure being associated with a cost; estimating a first damage to the building after a simulated earthquake utilizing a machine-learning program and the current fragility functions; determining new fragility functions for the building based on the retrofit measure and the current fragility functions; estimating a second damage to the building after the simulated earthquake utilizing the machine-learning program and the new fragility functions; and determining a difference in damage resulting from the retrofit measure based on the first damage and the second damage.

One general aspect includes a non-transitory machine-readable storage medium including instructions that, when executed by a machine, cause the machine to perform operations including: accessing, using one or more processors of a computer device, a database to retrieve current fragility functions for predicting structural damage to a building; identifying features of the building; identifying a retrofit measure to improve a structure of the building, the retrofit measure being associated with a cost; estimating a first damage to the building after a simulated earthquake utilizing a machine-learning program and the current fragility functions; determining new fragility functions for the building based on the retrofit measure and the current fragility functions; estimating a second damage to the building after the simulated earthquake utilizing the machine-learning program and the new fragility functions; and determining a difference in damage resulting from the retrofit measure based on the first damage and the second damage.

It is noted that the embodiments illustrated herein are described with reference to estimating earthquake damage, but the same principles may be applied to other disasters, such as floods, terrorism, fires, tornados, high winds, hurricanes, storms, tsunamis, heat waves, riots, war, etc.

FIG. 1 is a network diagram, according to some example embodiments, illustrating a network environment suitable for predicting structural damage caused by phenomena such as fire, earthquake, water, wind or the like. The network environment 100 includes a server machine 110, a database 115, and devices 130 and 150, all communicatively coupled to each other via a network 190. The server machine 110 may form all or part of a network-based system 105 (e.g., a cloud-based server system configured to provide one or more services to the devices 130 and 150). The server machine 110 and the devices 130 and 150 may each be implemented in a computer system, in whole or in part, as described below with respect to FIG. 26. The server machine 110 may contain algorithms that manipulate the data received from the user devices 150 to make the data usable, or to format the data, for use by the database 115.

Also shown in FIG. 1 are two example users 132 and 152 that may enter, for example, earthquake damage data into associated user devices 130, 150. For example, the device 130 may be a desktop computer, a vehicle computer, a tablet computer, a navigational device, a portable media device, a smartphone, or a wearable device (e.g., a smart watch or smart glasses) belonging to the user 132. The user devices 130, 150 may generate one or more of the GUIs shown herein. The database 115 may include historic data on phenomena such as earthquakes, floods, fire damage, wind, etc., and includes built-environment data and natural-environment data.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 26. As used herein, a "database" is a data storage resource and may store data structured as a text file, a table, a spreadsheet, a relational database (e.g., an object-relational database), a non-relational database, a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

FIGS. 2A-2B show example embodiments of screenshots 202 and 204 of an example graphical user interface (GUI) of selected "Did You Feel It" (DYFI) questions provided in the website of the United States Geological Survey (USGS), a scientific agency of the United States government.

After a natural disaster, such as an earthquake, emergency response centers receive a large number of 911 calls. For example, in the magnitude 6.0 Napa earthquake, thousands of 911 calls were received, and it took several days for the response teams to address all those calls. These calls are prioritized on a first-come first-served basis. However, some of the calls were not for help, but were placed just to notify the authorities about the earthquake. Further, about the majority of the calls did not come from Napa itself, but from neighboring areas, because the most-damaged areas did not have working telephone networks. Part of the job for an emergency manager is figuring out whether a jurisdiction is proclaiming or not, e.g., if the corresponding agency qualifies for Federal Emergency Management Agency (FEMA) aid or presidential declaration. Some emergency managers use a technique called windshield tours, where the emergency managers go around their jurisdiction, typically in a slow-moving car, and use a paper-map and a binder to manually note down the damage. It may take them several weeks to figure out whether a particular jurisdiction is proclaiming. Moreover, the accuracies of the windshield tours are pretty low, e.g. in the Napa 2014 earthquake, it took emergency managers 90 days to decide which areas were proclaiming, and several areas were missed.

Emergency-response teams aim to help those in need quickly, but it is difficult to prioritize responses after a natural disaster. Embodiments presented herein provide valuable tools to emergency operation centers (EOCs), response teams (e.g., fire stations), disaster planning organizations, community leaders, other government institutions, corporations site managers, etc., by estimating where the damage has been greatest and providing easy-to-use interface tools to indicate where rescue should be prioritized.

There are many types of data that may be used for estimating earthquake damage. One type of data is people impressions after an earthquake. The website of the United States Geological Survey (USGS) has an online post-earthquake survey form called "Did You Feel It?" (DYFI) where respondents report what they felt and saw during an earthquake.

For example, screenshot 202 in FIG. 2A is a user interface that asks the respondent several simple questions regarding the earthquake, such as how strongly was the earthquake felt, how long did the earthquake last, how did the respondent react, etc. Screenshot 204 of FIG. 2B presents the respondent a list of possible damage events, with a checkbox next to each event. The respondent may then select the events associated with the earthquake, such as no damage was inflicted, there are hairline cracks in the walls, ceiling tiles or lighting fixtures fell, there are cracks in the chimney, etc.

The USGS computes a Community Decimal Intensities (CDI) value for each survey response using Dewey and Dengler procedures, aggregates the data, and ultimately reports the aggregate CDI value for each zip code or other geographic region of interest. Community Decimal Intensities (CDI) are not individual observations, but rather a measure of earthquake effects over an area.

In example embodiments, the CDI values computed for each response are considered to be a classification for machine learning. CDI values may be augmented by other damage indicators including post-disaster inspection reports (e.g., red, yellow, and green tagging data), aerial, or satellite imagery, etc. In example embodiments, the scope of analysis may be restricted to estimating damage to city blocks, or to single-family homes, or to commercial buildings, or to special buildings (e.g., hospitals, firehouses). Example embodiments may allow an individual homeowner, with limited knowledge of earthquake engineering, to determine a damage state across a range of seismic hazard levels as well as calculate expected losses from each hazard level. Further, an expected annual loss may be determined that may be useful for making informed decisions regarding household financial planning. The damage estimates for single homes may be aggregated at the community or block level in order to use as a planning tool for emergency responders and city planners, for example. Decision makers may be better informed to make planning and policy decisions based on the probabilistic-based risk methods used to estimate structural damage presented herein.

A census block is the smallest geographic unit used by the United States Census Bureau for tabulation of 100-percent data (data collected from all houses, rather than a sample of houses). Census blocks are typically bounded by streets, roads, or creeks. In cities, a census block may correspond to a city block, but in rural areas where there are fewer roads, blocks may be limited by other features. The population of a census block varies greatly. As of the 2010 census, there were 4,871,270 blocks with a reported population of zero, while a block that is entirely occupied by an apartment complex might have several hundred inhabitants. Census blocks are grouped into block groups, which are grouped into census tracts.

In one example embodiment, a city block, also referred to herein as a block, is defined by the census block, but other example embodiments may define a city block as a different area, such as a census block group or a census tract.

In general, a block is a continuous region delimited by a geographic area, and each block may have the same size or a different size. For example, the block may range in size from one acre to ten acres, but other acreage may be used. In high-density population areas, the block may be as small as half an acre, but in less populated areas, the block may include 100 acres or more. A block may include zero or more structures.

In some example embodiments, to simplify definition, the blocks may be defined by a grid on a map, where each square or rectangle of the grid is a block. If a building were situated in more than one block, then the building would be considered to be in the block with the largest section of the building. In other example embodiments, the block is defined by the application developer by dividing a geographic area into a plurality of blocks.

Further, for example, immediately following an earthquake, a disaster response center within a community may be able to examine the estimate for the extent and severity of the damage to determine how homes (or any other physical structure) in their community are affected, and subsequently tailor response and recovery efforts based on the estimates.

The performance-based earthquake engineering (PBEE) methodology developed by the Pacific Earthquake Engineering Research (PEER) Center follows a logical, stepwise approach to performance assessment and subsequent damage and loss estimates of a structure due to an earthquake. The framework is rigorous, probabilistic, and utilizes inputs from disciplines such as seismology, structural engineering, loss modeling, and risk management to ultimately generate data of seismic consequences.

In an example embodiment, DYFI data for past California earthquakes is accessed to train the damage-estimation algorithm. The DYFI data includes information from events with at least 1,000 responses from 50 seismic events, with a bias towards more recent events, events centered near high-density populated areas, and events of larger magnitudes. The supplied data spans from magnitudes 3.4 (San Francisco Bay area, April 2011) to 7.2 (Baja, April 2010). It is however to be appreciated that DYFI data is merely an example of data that could be used, and that data from any other geographical areas or sources may also be used and analyzed. Another source data may be the Earthquake Clearinghouse maintained by the Earthquake Engineering Research Institute, or other repositories containing red, yellow, and green tagging data.

Features collected from the DYFI dataset include house location, damage state (CDI), and description of home damage. Another source of data is the USGS, which provides data including earthquake magnitude, duration of shaking, epicenter location, spectral acceleration (e.g., shakemap), soil type, elevation, and spectral acceleration at various return periods. Another source of data is the U.S. Census, which provides data for features such as house size, house age, and house price.

Further, features may be derived from other types of data by combining or calculating two or more pieces of information. For example, derived features include the probability of entering five different damage states (Hazus from the FEMA technical manual), spectral displacement, and probability of chimney cracking.

It is noted that Vs30 is a parameter that describes soil conditions. A ground motion parameter Sd may be calculated using a computing device as follows:

$$Sd = Sa\left(\frac{T}{\pi}\right)^2$$

Where Sa is spectral acceleration, a ground motion intensity parameter of an earthquake, and T is an assumed structural period (e.g., 0.35 s or 0.4 s, but other values are also possible). The assumed structural period may be determined from Hazus guidelines depending on the size of the building structure (e.g., home).

Figure 3:
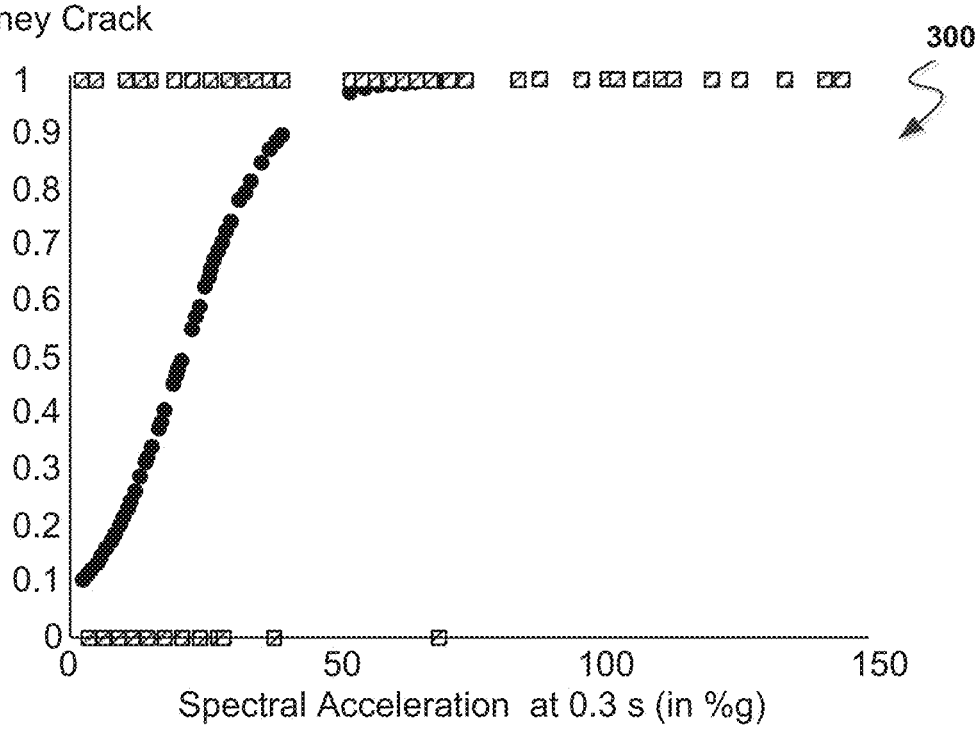
FIG. 3 shows a chimney fragility curve, according to some example embodiments.

FIG. 3 shows a chimney fragility function 300, according to some example embodiments. A fragility function, also referred to herein as a fragility curve, is a mathematical function that expresses the probability that some undesirable event occurs (e.g., that an asset—a facility or a component—reaches or exceeds some clearly defined limit state) as a function of some measure of environmental excitation (typically a measure of acceleration, deformation, or force in an earthquake, hurricane, or other extreme loading condition). The fragility function represents the cumulative distribution function of the capacity of an asset to resist an undesirable limit state.

For example, a fragility function for a feature (e.g., a chimney, a foundation, the integrity of the structure, a window, etc.) associated with a building expresses the probability that the feature will suffer damage after an earthquake based on the shaking of the building caused by the earthquake.

The fragility curve depends on many parameters, such as structural type (construction material), size, seismic zone, and seismic design code used (which is a function of location and age of the structure). In some example embodiments, the damage may be labeled as N (none), S (slight), M (moderate), E (extensive), and C (complete). In an example embodiment, P (no damage) and P (slight damage) may use Sd as an input along with stored fragility parameters. The probability of no damage for each of five damage states may be computed using the Hazus fragility curve parameters (e.g., using Hazus Technical Manual). The probable damage states for structural, non-structural drift-sensitive, and non-structural acceleration-sensitive components may be computed separately using one or more computing devices.

It is noted that fragility functions are often represented as two-dimensional plots, but the fragility functions may also be created using 3 or more dimensions, in which case, the effect of two or more features are combined to assess the damage state. Further, fragility functions are not static, and may change over time. Natural environmental conditions changes (e.g., water table and climate), and man-made conditions changes (e.g., structural retrofits and new construction) may require fragility functions to be modified over time to facilitate more accurate damage predictions. Fragility functions for a given structure may also be changed based on damage that the given structure may have sustained due to a previous earthquake. Modified fragility functions may then be used to estimate structural damage during an aftershock, resulting in more accurate damage predictions than predictions from unmodified fragility functions.

As discussed above, DYFI data may include information about observed damage to walls, chimneys, etc. The probability of a chimney cracking may be computed by sorting DYFI responses into two categories: whether any type of chimney damage was reported or not. A sigmoid fragility function may then be fit through logistic regression such that the independent variable is spectral acceleration Sa at a structural period of, for example, 0.3 seconds, and the dependent variable is the probability of chimney cracking Pcc. In some example implementations, the sigmoid function is approximated by a cumulative log normal function.

Fragility function 300 is an example chimney fragility curve. In an example embodiment, a probability of 1 corresponds to Sa values that may have driven chimney damage. The example chimney fragility curve, a sigmoid curve, is fairly steep, indicating there is a fairly abrupt transition from no damage to some damage for increasing values of spectral acceleration.

An example empirical fragility curve may be derived using the following equation:

$$Pcc = 0.5 + 0.5 * Erf\left(\frac{\ln Sa - \mu}{(2\sigma)^2}\right)$$

Where Pcc is the fragility estimation of the probability that the structure's chimney is cracked given a spectral acceleration, Sa is the ground-motion intensity parameter, Erf is the complementary error function of the log normal distribution, $\mu$ is the mean, and $\sigma$ is the standard deviation of the variable's natural logarithm. In this example, $\mu$ is 3.07 and $\sigma$ is 0.5.

Figure 4:
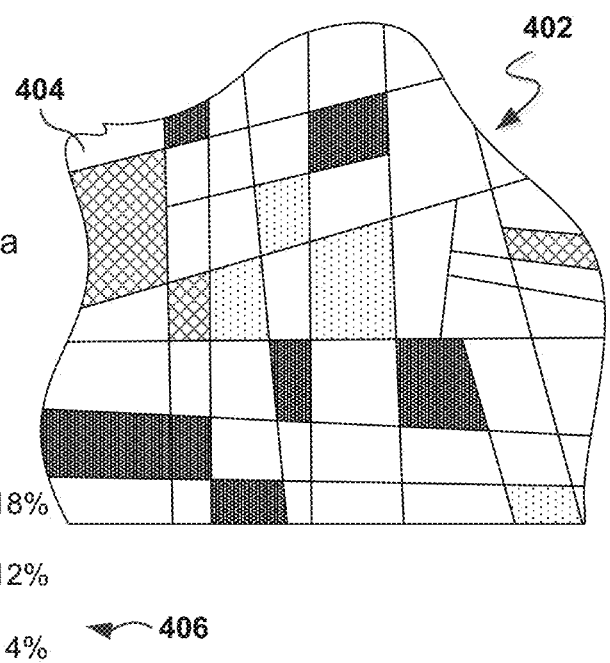
FIG. 4 illustrates the Block Damage Index (BDI) by city block, according to some example embodiments.

FIG. 4 illustrates the block damage index (BDI) by city block 404, according to some example embodiments. After entering basic earthquake information, which may be an automated step, like epicenter latitude, longitude, and magnitude, the web application may generate maps, each of which may provide a predicted damage state distribution of neighboring areas (e.g., 100 km from the epicenter) in one example.

Despite the highly uncertain nature of earthquake engineering problems, augmenting the PBEE framework with machine learning results in acceptable accuracy in damage prediction. In an example embodiment, the SVM provides at least a plausible representation of damage. In fact, this means that machine learning may replace waiting for DYFI data when estimating community-wide damage. Further, this approach may, in certain embodiments, fill in geographic gaps in community-wide damage assessment, giving near-immediate and fairly accurate results. Situational awareness immediately after any type of natural disaster may be enhanced, and resource allocation of response equipment and personnel may be more efficient at a community-level following this approach. Although some example embodiments described herein are with reference to California, it should be noted that the methods and systems described herein may be applied to any geographical area.

In an example embodiment, comprehensive housing data may improve damage-state estimates. Additionally, the methodology described herein may apply to the analysis of any type of structure (or structures), taking into account their current seismic health, type of construction material, and lateral resisting system. Example embodiments may allow for better damage analysis for the community, including businesses, mid-rises, etc., and thereby provide a more accurate estimate of loss. It is however to be appreciated that the methods and systems described herein may also be applied to predicting fire damage, flood damage, wind damage, or the like.

Empirical equations (extracted from parametric learning techniques) relating damage state to the input features are used in some example embodiments. In an example embodiment, a Monte Carlo method is used to obtain data for higher CDI values since there are few training data available. In certain circumstances, shaking intensity values of large events at other parts of the world (e.g., Tohoku, Japan, 2010), which are not necessarily in a similar scenario, are applied using transfer-learning techniques to extrapolate to other regions. Using transfer-learning techniques, the prediction of damage states for severe catastrophes is enhanced.

As the algorithms estimate damage after an earthquake, as discussed in more detail below, in some example implementations, an estimate of damage is provided by city block 404 in a map. In the example embodiment of FIG. 4, the map shows the damage estimate 402 by city block 404, and the damage is represented by the shading (or color) of the city block 404. It is noted that the terms "damage estimate" and "damage prediction" are used herein to denote the output of the machine-learning algorithm, the difference being that "damage estimate" refers to an event that has already taken place (e.g., a new earthquake) while "damage prediction" refers to an event that has not taken place yet (e.g., effects of a machine-simulated earthquake), although the term "prediction" may sometimes be used to estimate the damage after an earthquake since damage data is not yet available.

In general, a large variation may be expected in observed damage states from earthquakes. In an example embodiment, and illustrated in FIG. 4, damage is classified into four damage states, and each damage state is given a Block Damage Index (BDI) label 406 in lieu of a CDI label. Depending on the level of precision desired, the number of classifications and the scaling system may change, but in general, this is a reasonable approach based on the exclusivity and differentiability of each of the four damage states. In one example implementation, BDI labels 406 are defined as follows:

BDI=0 for CDI≤4;
BDI=1 for CDI≤7;
BDI=2 for 7<CDI≤9; and
BDI=3 for CDI>9.

In one example implementation, each BDI is assigned a color for the user interface: 0 is green, 1 is yellow, 2 is orange, and 3 is red, but other color mappings are also possible. For each city block 404, the BDI represents the most probable damage index of a typical building within that specific city block 404. In one example embodiment, the typical building is calculated by averaging the data for the buildings in the city block 404.

In some example embodiments, in a short amount of time after an earthquake (e.g., 15 minutes), a damage estimate 402 is provided by city block 404. These estimates 402 may be used by the EOC to prioritize rescue operations. In other solutions, EOCs utilize a heat map of 911 calls, but this may be misleading because the worst-damaged areas will not have phone service.

In some example embodiments, a BDI of 3 for a city block 404 does not mean that all the buildings in the block have a damage index of 3. Different builders may have different structures, ages, etc., so having a total city collapse may be infrequent. A city block is said to have a BDI of 3 when at least a predetermined percentage of buildings in the block have a damage index of 3, such as, for example, when at least 10% of the buildings in the block have damage index of 3. The percentage threshold may be adjusted and vary between 1 and fifty percent or some other greater value.

In one view, the operator may change the percentage threshold. For example, if the operator wants to see all the city blocks 404 with at least one building with a damage index of 3, the threshold may be lowered to a very small number, such as 0.01%.

Figure 5:
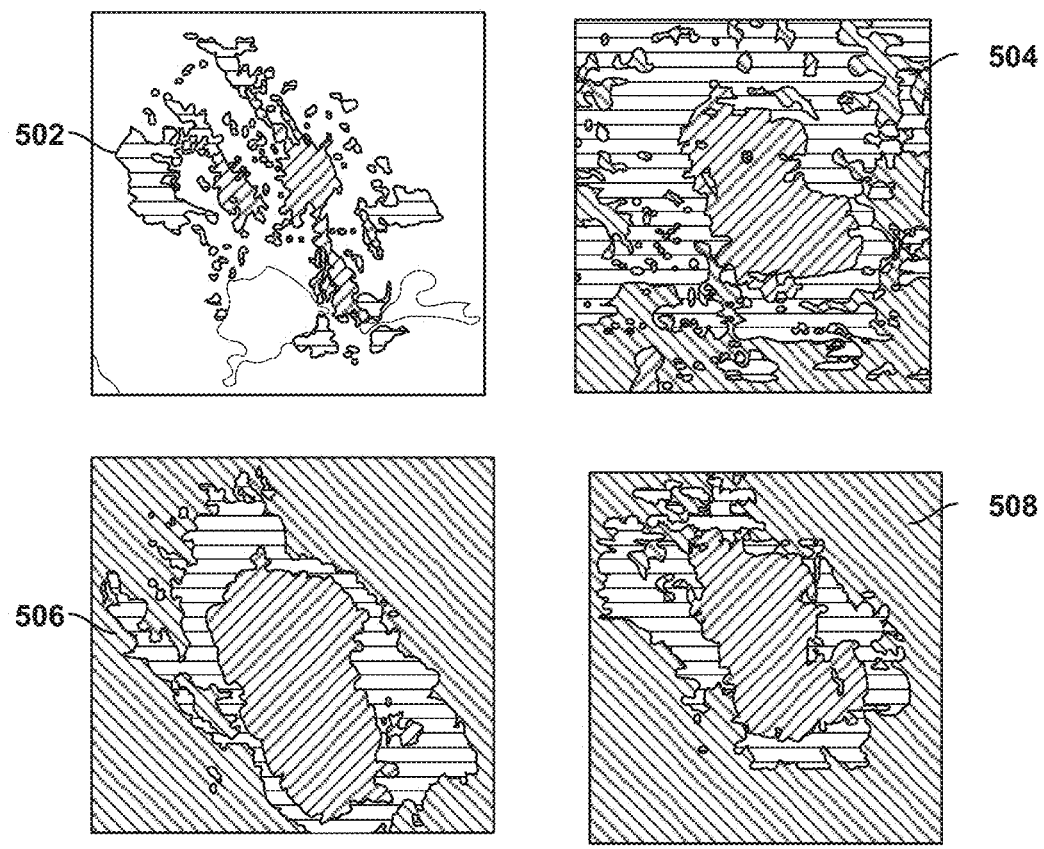
FIG. 5 shows an example graphical representation comparing DYFI data to Random Forest (RF), neural networks (NN) BDI, and Support Vector Machines (SVM) BDI damage-prediction results of the August 2014 (Napa) earthquake, according to one example embodiment.

FIG. 5 shows an example graphical representation comparing actual DYFI data 502 to RF 504, NN 506, and SVM 508 BDI damage-prediction results of the August 2014 (Napa) earthquake, according to one example embodiment. Machine learning is a field of study that gives computers the ability to learn without being explicitly programmed. Machine learning explores the study and construction of algorithms that may learn from and make predictions on data. Such machine-learning algorithms operate by building a model from example inputs in order to make data-driven predictions or decisions expressed as outputs. Although example embodiments are presented with respect to a few machine-learning algorithms, the principles presented herein may be applied to other machine-learning algorithms.

In some example embodiments, different machine-learning algorithms may be used. For example, Random Forest (RF), neural networks (NN), and Support Vector Machines (SVM) algorithms may be used for estimating damage. More details are provided below regarding the use of machine-learning algorithms with reference to FIGS. 9 to 15. In some example embodiments, ensemble methods may be utilized, which are methods that utilize multiple machine-learning algorithms in parallel or sequentially in order to better utilize the features to predict damage.

RF is robust in dealing with outliers, such as variation in damage states of nearby points, at the expense of relatively less predictive power. Moreover, RF may be good at ignoring irrelevant data. SVM may be considered because of its higher accuracy potential and theoretical guarantee against overwriting. NN may be considered because NN produces an equation relating damage with the algorithm features. This equation could then be used to get empirical relationships between damage and features.

After implementing RF, SVM, and NN algorithms, damage predictions for one example earthquake were compared to the actual DYFI data. FIG. 5 shows a graphical comparison of the actual DYFI data 502 to estimates given by RF 504, NN 506, and SVM 508, for the August 2014 (Napa) earthquake. It may be observed that the distribution of the damage states compares well with the actual DYFI data 502 distribution. In addition, the algorithms appear to be robust; the algorithms calculated damage states for regions where no DYFI response was recorded. This may be helpful in areas where the community is not able to access DYFI quickly after an earthquake due to lack of connectivity or where significant damage is caused by the earthquake. It is noted that a boundary between the lower two damage states is much more refined in SVM 508 than RF 504 due to SVM's resistance to over-fitting. Hence, SVM was considered to be a good machine-learning model for this example earthquake.

It may be reasonable to assume that the general scope of damage and loss is fairly similar within the same damage state. A similar assumption may be made in the PBEE approach, and structures are said to be in the same damage state if they would undergo the same degree of retrofit measures. Example tuning parameters for SVM, C (penalty) and g (margin) may also be determined.

Figure 6:
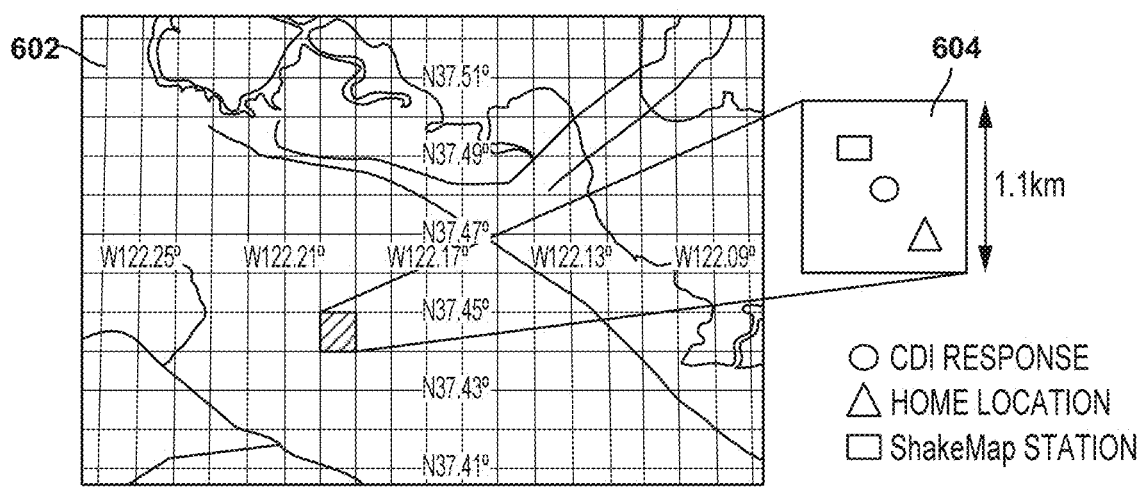
FIG. 6 shows an example embodiment for aggregating data from multiple sources to the same locations using a nearest neighbor function.

FIG. 6 shows an example embodiment for aggregating data from multiple sources to the same locations using a nearest neighbor function. In an example embodiment, a final stage of data pre-processing is performed to eliminate any skewness/bias of the data towards lower to mid-level CDIs (e.g., below 8). Approximately equal numbers of data points pertaining to each damage state may make learning more productive and effective in future predictions. Monte Carlo simulation may be used in order to increase the amount of data points for higher CDIs (e.g., above 8). The data may then be randomized and features may be scaled, for example, between 0 and 1. This scaling may allow the algorithm to treat each feature equally and avoid the possibility of a skewed dataset. In some example embodiments, an "in-poly" function is used to geographically associate features within boundaries, e.g., a seismic zone or a city block, particularly when the block has an irregular shape.

In an example embodiment, at a conclusion of a pre-processing phase, only the most accurate data spanning the entire range of CDIs may remain. In an example embodiment, this remaining data may define or form the training dataset. Map 602 in FIG. 6 is a satellite map of an area, which is subdivided into square areas. If the operator zooms in on the map 604, additional points of interests are identified, such as the location of the CDI response center, the location of a particular home, or a ShakeMap station.

Figure 7:
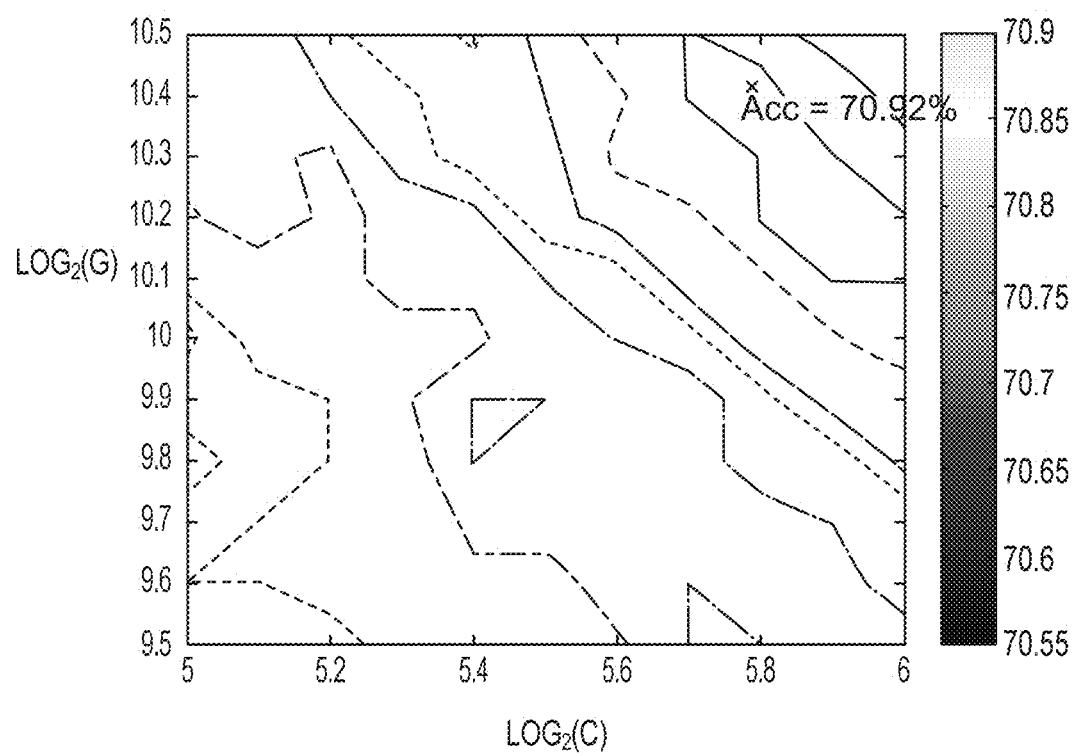
FIG. 7 shows an example cross-validation contour plot for a preliminary dataset, according to some example embodiments.

FIG. 7 shows an example cross-validation contour plot for a preliminary dataset, according to some example embodiments. Several cross-validation contour plots were created as an example of tuning the model. Once the training set was solidified and the sequence of algorithms were chosen, tuning was done in order to prevent over-fitting or under-fitting data when the model is used to predict damage following the next earthquake. In the example plot, the best accuracy is about 70.92%, occurring when C=5.8 and g=10.4. A Gaussian kernel is chosen by way of example as the best fit after experimenting with linear, polynomial and other RBF kernel options.

In an example embodiment, forward and backward search methods are used to determine which features contribute more than others to accurate damage estimation. In an example embodiment, the parameters Vs30, Sa, Sd, P (no damage), P (slight damage), and P (chimney damage) were used.

Figure 8:
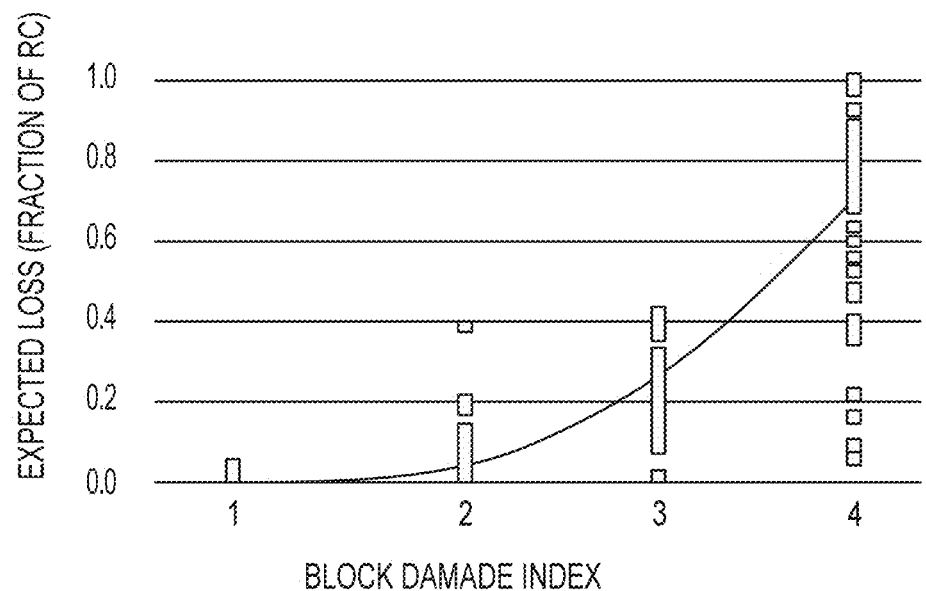
FIG. 8 shows an expected loss of an example home curve, according to some example embodiments.

FIG. 8 shows an expected loss of an example home curve, according to some example embodiments. In some example embodiments, the performance-based earthquake engineering approach is used to calculate financial loss from structural damage using a damage ratio and the structure's replacement value. In an example embodiment, expected values of economic loss and recovery time are calculated. For example, using the entire training set, repair cost ratios from Hazus are used for the calculations.

To calculate the expected loss, a weighted sum of the loss, given the damage state and the probability of being in each Hazus damage state, may be determined through a weighted sum technique. In an example embodiment, structural, non-structural drift-sensitive, non-structural acceleration-sensitive, and contents are considered separately. The conditional loss parameters may be adopted from the Hazus technical manual.

The expected loss of the home may be defined as the sum of expected losses for structural and non-structural elements, not including contents. A similar plot may be developed for expected loss of contents. Expected annual loss (EAL) for both home and contents may be calculated by numerical integration across the hazard curve from, for example, 0.01 g to 5.0 g using a step size of 0.01 g. Recovery time may be computed in a similar fashion as expected losses. Recovery parameters may be obtained from the Hazus technical manual, and include not only construction time, but also time to procure financing, design, decision making, or the like. A mean and standard deviation of loss and recovery time at each BDI may be determined and applied to each respective BDI prediction. Additionally, loss estimates may be aggregated at the block level and displayed on a map or in a report.

Figure 9:
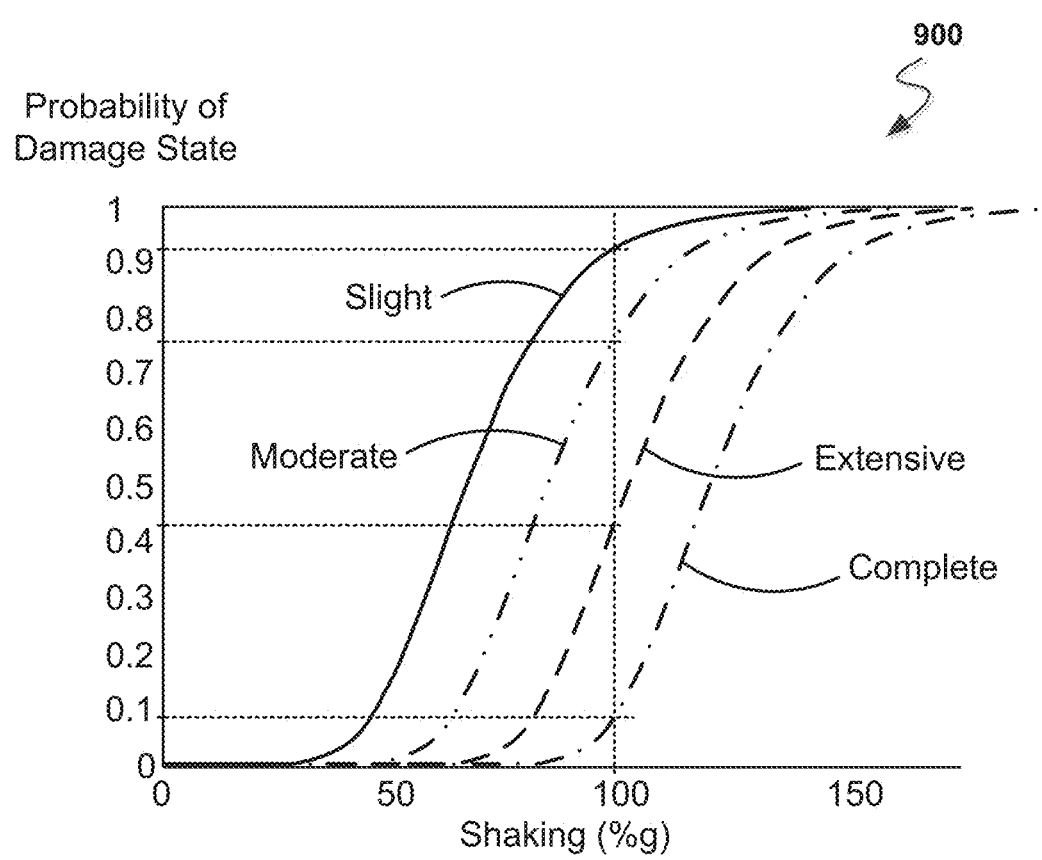
FIG. 9 shows fragility functions for different damage index levels, according to some example embodiments.

FIG. 9 shows fragility functions 900 for different damage index levels, according to some example embodiments. As discussed above, the fragility functions provide the probability of damage state as a function of the shaking. FEMA defines a building type framework with up to 252 types of buildings, and each building within the region is assigned to one of these 252 types. For example, the types may be based on construction material, number of stories, etc., and one type is defined for two-story wooden structures. Further, buildings within one or more blocks may be assigned to additional building types above and beyond the FEMA framework, as applicable, if needed in order to better represent the response of that building to the effects of earthquakes or other disasters.

Each structure may respond differently to an earthquake; therefore, a fragility function is calculated for each type. In the example embodiment of FIG. 9, fragility functions 900 are defined for one building type for the four different types of damage. Based on that, the probability of being in one of the five damages states (none, slight, moderate, extensive, or complete) or a state of higher damage may be determined. For example, for a shaking of 1 g, the probability of no damage is 8%, the probability of slight damage or worse is 25%, the probability of moderate damage or worse is 58%, the probability of extensive damage or worse is 91%, and the probability of complete damage is 9%. This means that for the same shaking, the probability of higher damage is lower, in general.

In one example embodiment, these fragility curves are used to estimate the damage for each building type once the shaking of the building is determined according to its location. However, there are more factors that affect damage besides building type, such as the soil type, year built, building price, etc. For example, not all the two-story wooden buildings have the same price and are built with the same quality. Therefore, the damage resulting to these buildings may vary significantly. Thus other example embodiments utilize more features, besides building type, to estimate damage.

Machine-learning algorithms work well for predicting damage because these algorithms analyze a plurality of features and how the features correlate to the damage inflicted. For example, machine-learning algorithms may take into account hundreds of features to estimate damage.

Figure 10:
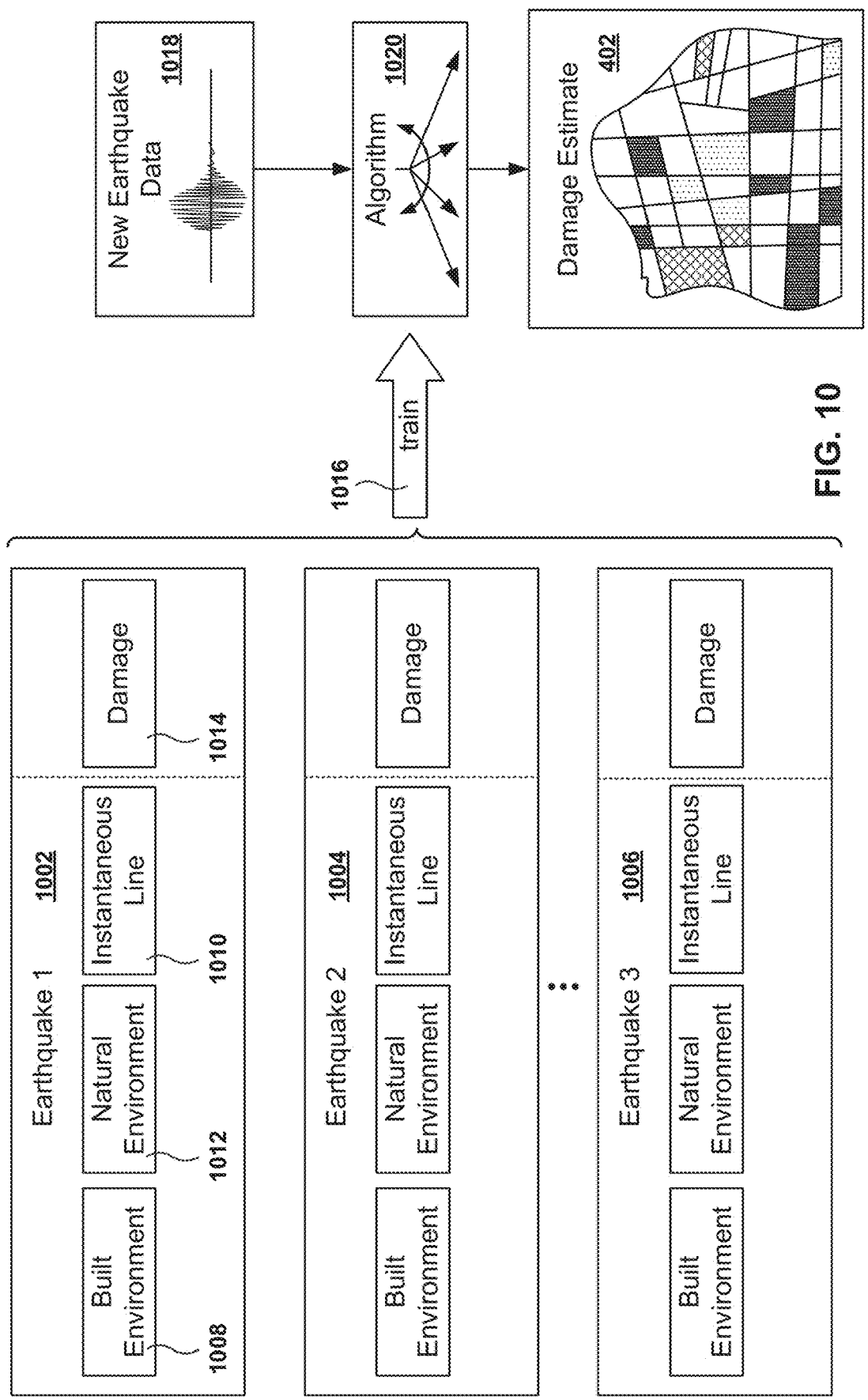
FIG. 10 shows example embodiments illustrating the use of a machine-learning algorithm for predicting earthquake damage.

FIG. 10 shows example embodiments illustrating the use of a machine-learning algorithm for predicting earthquake damage. In some example embodiments, the data from a plurality of earthquakes 1002, 1004, 1006, is collected to train the algorithms. For example, one of the data sources could be building tagging. After an earthquake, building inspectors visit buildings and assign a tag on the severity of the damage to the building. These tags may be used to modify the BDI predictions in real-time.

Another type of data, as discussed earlier, is DYFI data regarding people's impressions of the damage, which may come through entries on a website or through telephone calls. This information provides data for different types of homes and for different types of earthquakes, and this data is geo-coded, including latitude, longitude, and a measurement of damage. New DYFI data points obtained after the earthquake may be used as real-time data input to enrich and improve the initial real-time BDI predictions. Other real-time data sources include smart-phone applications, manual user-inputs, building tagging data, satellite images, drone images, etc. These additional data sources may be used to modify and improve the accuracy of the initial BDI predictions as time progresses after the earthquake, e.g., hours of days later. In addition, processes such as belief propagation, online learning, and Markov models may be used in conjunction with real-time data to improve the BDI predictions.

In example embodiments, pre-processing of data for algorithm training is performed to fit within a single-family home scope (or any other selected building structure), and as example DYFI responses may not list a location of the building structure during an earthquake. In example embodiments, when an analysis is performed on a single family home, data not pertaining to single-family homes may be removed. Next, in an example embodiment, all response data that is not geo-located by USGS may be removed to enhance precision. In an example embodiment, the data from 50 earthquakes provided in the database, (e.g., with at least 1000 responses remaining), were used for the training set. For example, for privacy constraints, USGS data may publicly report DYFI data with two-digit latitude and longitude accuracy, meaning the geo-located point could be up to about 0.6 km away from the true location of the structure affected by an earthquake. Tagging data, on the other hand, may be identifiable to the exact structure.

Further, spectral acceleration information from USGS's ShakeMap website may be obtained for each of the earthquakes. These ShakeMap files may include not only data from strong motion stations throughout the state, but also interpolated spectral ordinates using weighted contributions from three attenuation functions at regular, closely-spaced intervals. Since the locations of many of the machine-learning features described herein, such as spectral acceleration, elevation, soil, etc., are available to four-decimal latitude and longitude accuracy, the two-decimal accuracy of DYFI data may not exactly align with the data from the other sources. To remedy this geographic disparity, using a nearest neighbor function, a nearest value of spectral acceleration may be assigned to each DYFI response. If there was no ShakeMap data point within 1 km of a DYFI response, the DYFI response may be excluded from the training set. Similarly, when appropriating housing data to a DYFI response, the nearest neighbor function may be used.

In some embodiments and as shown in FIG. 10, three types of features are identified: built environment data 1008, natural environment data 1012, and instantaneous line data 1010, also referred to as sensor data. Built environment data 1008 includes data regarding anything built by humans, such as buildings, bridges, roads, airports, etc. Built environment data 1008 includes the type of building, age, size, material, type, number of stories, fragility functions, etc.

"Natural environment" refers to objects or structures present in nature, such as soil, damns, rivers, lakes, etc. Natural environment data 1012 includes features related to soil, such as soil type, soil density, soil liquefaction; data related to water table; elevation, etc. For example, one soil parameter is the shear wave velocity of soil Vs30. This data may be obtained from USGS or FEMA.

Further, instantaneous line data 1010 refers to sensor data obtained during an earthquake, such as by data obtained from earthquake seismographs, which may be operated by the USGS or by other entities that make the information openly available. The shaking information is obtained through one or more scattered measuring stations, but the shaking is estimated throughout the region of interest utilizing ground-motion prediction equations, which predict how much the ground is moving throughout the different locations. Sensor data may also be obtained from accelerometers or other sensors placed on buildings and infrastructure. Further, data from accelerometers in smartphones, laptops, and other computing devices, may be incorporated as instantaneous line data. Both S waves and P waves may be used in real-time as instantaneous line data.

Level of damage 1014 is the variable that is to be estimated or predicted. For training, damage data is associated with the different input features to establish the correlation between each feature and damage. In some example embodiments, the estimated damage is presented in the form of BDI damage, i.e., 0 (e.g., no damage), 1, 2, or 3 (e.g., complete collapse of the structure), but other types of damage assessment categories may also be utilized (e.g., foundation damage).

Once all the data is collected, the machine-learning algorithm training 1016 takes place, and the algorithm is ready for estimating damage. When a new earthquake occurs, the new earthquake data 1018 is obtained (e.g., downloaded from the USGS website). The machine-learning algorithm 1020 uses the new earthquake data 1018 as input to generate damage estimate 402.

Figure 11:
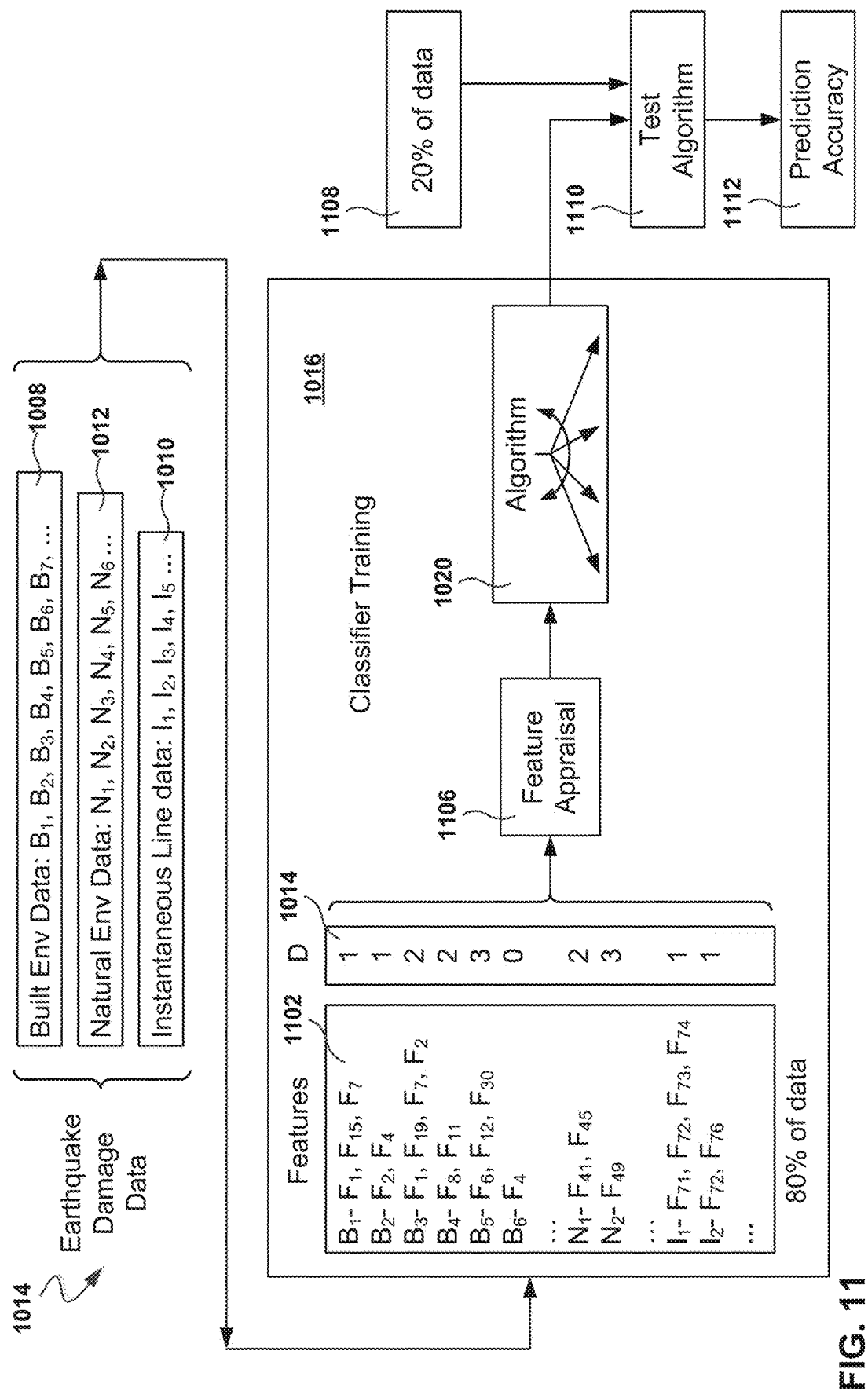
FIG. 11 illustrates a method, according to some example embodiments, for training the algorithm to predict damage.

FIG. 11 illustrates the method, according to some example embodiments, for machine-learning algorithm training 1016 to predict damage, also referred to herein as algorithm learning. As discussed above, in some example embodiments, the training set data includes built environment data 1008, natural environment data 1012, and instantaneous line data 1010. Each of these categories includes one or more types of data, such as $B_1$, $B_2$, $B_3$ for built environment data 1008; $N_1$, $N_2$, $N_3$ for natural environment data 1012; and $I_1$, $I_2$, and $I_3$ for instantaneous line data 1010. For example, $B_1$ is data for a particular house and may include DYFI information such as a crack on the chimney, or any other damage information for the house. Further, for the instantaneous line data 1010, archived live data is used for the training. The data may correspond to one or more earthquakes. In one example embodiment, the data for 52 different earthquakes is utilized.

Each of the data points is correlated to one or more features 1102 and a level of damage 1014. This is the training set for appraising 1106 the relationship between each of the features and the damage caused. Once the appraisal is done, the algorithm 1020 is ready for estimating or predicting damage.

In some example embodiments, part of the data for the level of damage 1014 is not used in the training phase (e.g., 1016), and instead is reserved for testing the accuracy of the algorithm. For example, 80% of the available data is used for training the algorithm, while 20% of the data 1108 is used for testing the algorithm 1110. Different amounts of data may be reserved for testing, such as 10%, 30%, etc., and different segments of the data may be reserved for testing.

In order to test the algorithm 1110, 20% of data 1108 is fed the algorithm as if the data 1108 was originated by a new earthquake. The algorithm then presents damage estimates, and the damage estimates are compared to the actual damage to determine prediction accuracy 1112 of the algorithm.

It is noted that some of the data is available at the building level (e.g., damage inflicted on a specific building) but the predictions, in some example embodiments, refer to damage at the block level.

Sometimes, there is no data for all the buildings in a block, so damage extrapolation is performed. For example, if after an earthquake, a building inspector gives red tags (i.e., damage index 3) to three buildings in a block of 20 buildings, i.e., three out of 20 buildings have damage while the rest have no damage or minor damage.

In some example embodiments, the type of each building is identified, and the fragility functions of the buildings are identified based on the type. Then, a structural engineering assumption is made that the different effects from one building to another are due to each building having a different fragility function, because other features like shaking, soil, etc., are substantially equal for the whole block.

In some example embodiments, the type of the building is unknown, but it may be known that 5% of the buildings have suffered damage. In this case, a fragility function is identified that corresponds to the damage, based on the shaking, and then that fragility function is assigned to the building.

There are four types of validation procedures to test the machine-learning algorithms: intra earthquake, inter-earthquake, geographic division, and holdout cross validation. In intra-earthquake validation, the learning and the testing are performed with data from the same earthquake. For example, the algorithm trains on 80% of the Napa earthquake data and then the algorithm is tested on the remaining 200, of the Napa earthquake data. This is the easiest type of learning.

In inter-earthquake validation, training is done on data from a plurality of past earthquakes (e.g., 20 earthquakes), and then the algorithm is used to predict the effects of another actual earthquake (e.g., the Napa earthquake). Thus, the learning is done without data from the Napa earthquake, and then the validation is performed with data from the Napa earthquake.

In geographic-division validation, the testing is performed on data from a different geographic location. In holdout cross validation, the holdout data used for testing is changed multiple times. For example, 90% of the data is used for learning and 10% of the data is reserved for testing, but the 10% is changed each time. The algorithm keeps improving until the best model is obtained. It is possible to hold out different amounts of data, such as 20% or 30%.

FIG. 12 shows a confusion matrix, according to an example embodiment, for predictions of damage for 512 testing points. It is to be appreciated that a different number of testing points may be used in other example embodiments. A confusion matrix is a table used to describe the performance of a classification model on a set of test data for which the true values are known or assumed based on engineering judgement.

Testing accuracy is measured by determining how many data points where predicted correctly. In the example embodiment of FIG. 12, table 1202 describes the correlation between actual BDI and the predicted BDI. For example, the actual BDI included 107 city blocks with a BDI 2. Of the 107 BDI 2 in the example data, a SVM model correctly classified 97 (91%), and misclassified three for BDI 0 and seven for BDI 1. Additionally, of the 195 BDI 0 in the example data, the SVM model correctly classified 172 (88%), and misclassified 23 as BDI 1. In the given example, the poorest classification is of the BDI 1, where 66 of the 203 were misclassified. Thus, for this example dataset, the model was less accurate for the lower levels of damage. However, this may be a non-critical factor when considering that the lower levels of damage generally do not contribute to major portions of the damage as the structure (e.g., of a home) remains more or less elastic. In other words, it is usually more important to be accurate when predicting higher levels of damage, and the response centers are mostly interested in these higher levels of damage. The performance of the model for each classification level may be tailored relative to the other classification levels based on the specific use case.

FIG. 13 shows a performance comparison of algorithms in accordance with some example embodiments. FIG. 13 illustrates some of the accuracy values obtained for the RF, SVM, and NN algorithms. It is noted that the results illustrated in FIG. 13 are examples, and other data sets may produce different results. The example embodiments illustrated in FIG. 13 should therefore not be interpreted to be exclusive or limiting, but rather exemplary or illustrative.

Using the final feature list, an F score for the SVM model, for the August 2014 (Napa) earthquake, was 0.879. Given the amount of randomness and outliers in damage predictions, this F score indicates fairly good results.

Figure 14:
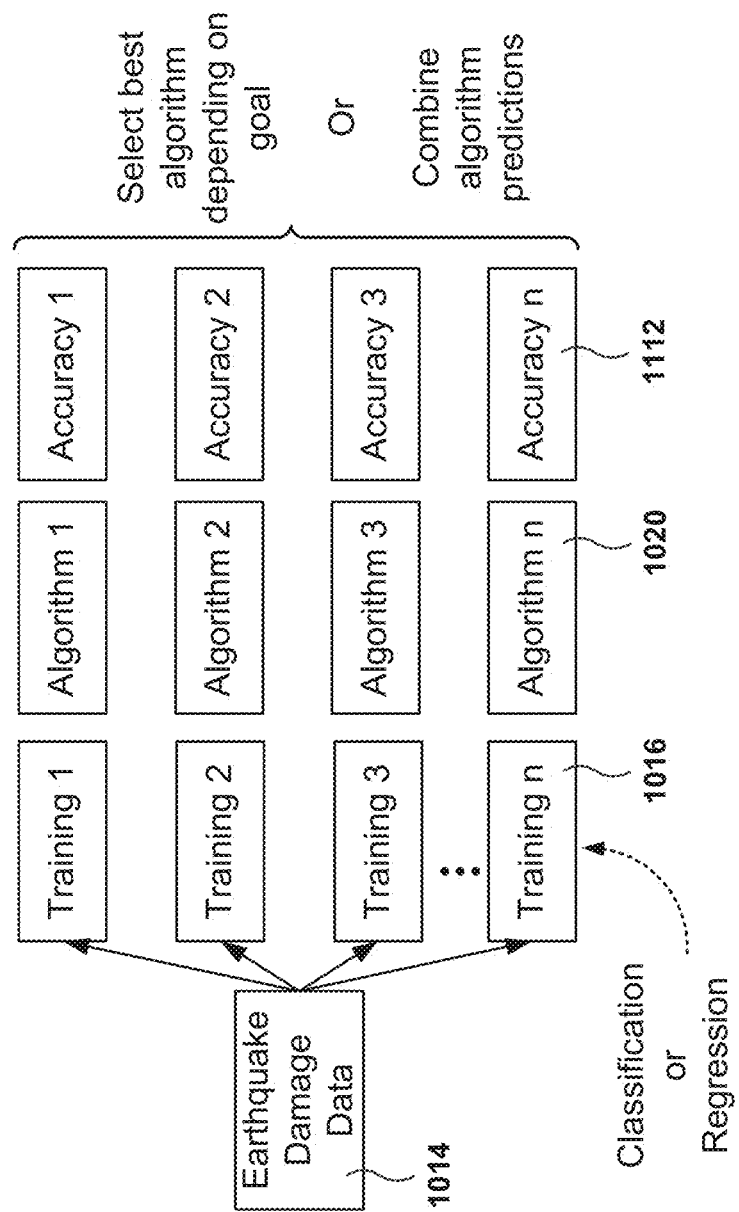
FIG. 14 illustrates example embodiments for the selection of an algorithm based on predictive accuracy.

FIG. 14 illustrates example embodiments for the selection of an algorithm based on predictive accuracy. As discussed above, multiple algorithms 1020 may be used for estimating damage, and training the algorithms 1016 may be performed in different ways to predict accuracy 1112.

Once the algorithms are tested, the best algorithm is selected, although the best algorithm may change depending on the goal and the data set. In other example embodiments, the estimates from the multiple algorithms may be combined depending on the goal.

There are two types of problems in machine learning: classification problems and regression problems. Classification problems aim at classifying items into one of several categories. For example, is this object an apple or an orange? In our case, it is important to classify between damage and no damage.

Regression algorithms aim at quantifying some item, for example by providing a value that is the real number. In some example embodiments, classification is used to determine damage or no damage, and regression is used to determine the level of the damage. For example, the algorithm could obtain a damage value of 1.3, which, depending on the goal, may or may not be rounded to the nearest whole number, e.g., 1.

During testing, ensemble methods provided a high level of accuracy, because ensemble methods utilize multiple learning algorithms, both classification and regression, to improve predictive performance. It has been observed that regression models are good at predicting between BDI's 1, 2, and 3, but classifiers are better at distinguishing between zero and nonzero.

In some example embodiments, the selection of algorithm is biased towards getting BDI labels 2 and 3 correctly, because emergency response managers are especially interested in BDI's 2 and 3, the highest levels of damage. No damage or low damage is not as important for receiving help, but BDI 2 and BDI 3 are much more important. This means that when selecting an algorithm, the algorithms that better predict BDI 2 and BDI 3 are chosen over other algorithms that may perform better for other categories, such as predicting BDI 0 and BDI 1.

One of the problems in predicting damage is selecting the best possible data for learning. Some of the perception data may include people reports such as "I have a broken chimney," or "My picture frame was moving in front of me." However, this type of data may not be helpful for BDI classification.

In order to leverage this type of damage information, other machine-learning methods are used, referred to herein as mini-machine learning models. In the mini-machine learning models, the additional damage data is utilized to predict other factors that may be used by the BDI-classification algorithms, a method referred to as cascading models. For example, it is possible to estimate how many people were awake, or how many broken chimneys were caused by an earthquake, and use this information for estimating damage.

Another problem relates to estimating damage caused by high-magnitude earthquakes. Data for California earthquakes is available, which includes earthquakes in magnitude up to 7.1 on the Richter scale. However, the question remains, is this data good enough to predict a large earthquake (e.g., a 7.5 earthquake)?.

In one example embodiment, transfer-learning techniques are utilized to predict the effects of large earthquakes. Inductive transfer, or transfer learning, is a research problem in machine learning that focuses on storing knowledge gained while solving one problem and applying it to a different but related problem.

Data from other countries that have had large earthquakes is gathered, such as earthquakes in Mexico, Chile, Peru, Ecuador, Japan, and New Zealand. While the type of data available is different because it is not provided by the USGS, it is still useful as damage data. Transfer learning enables the use of this different type of data for predicting large earthquakes in California, or in other parts of the United States.

Figure 15:
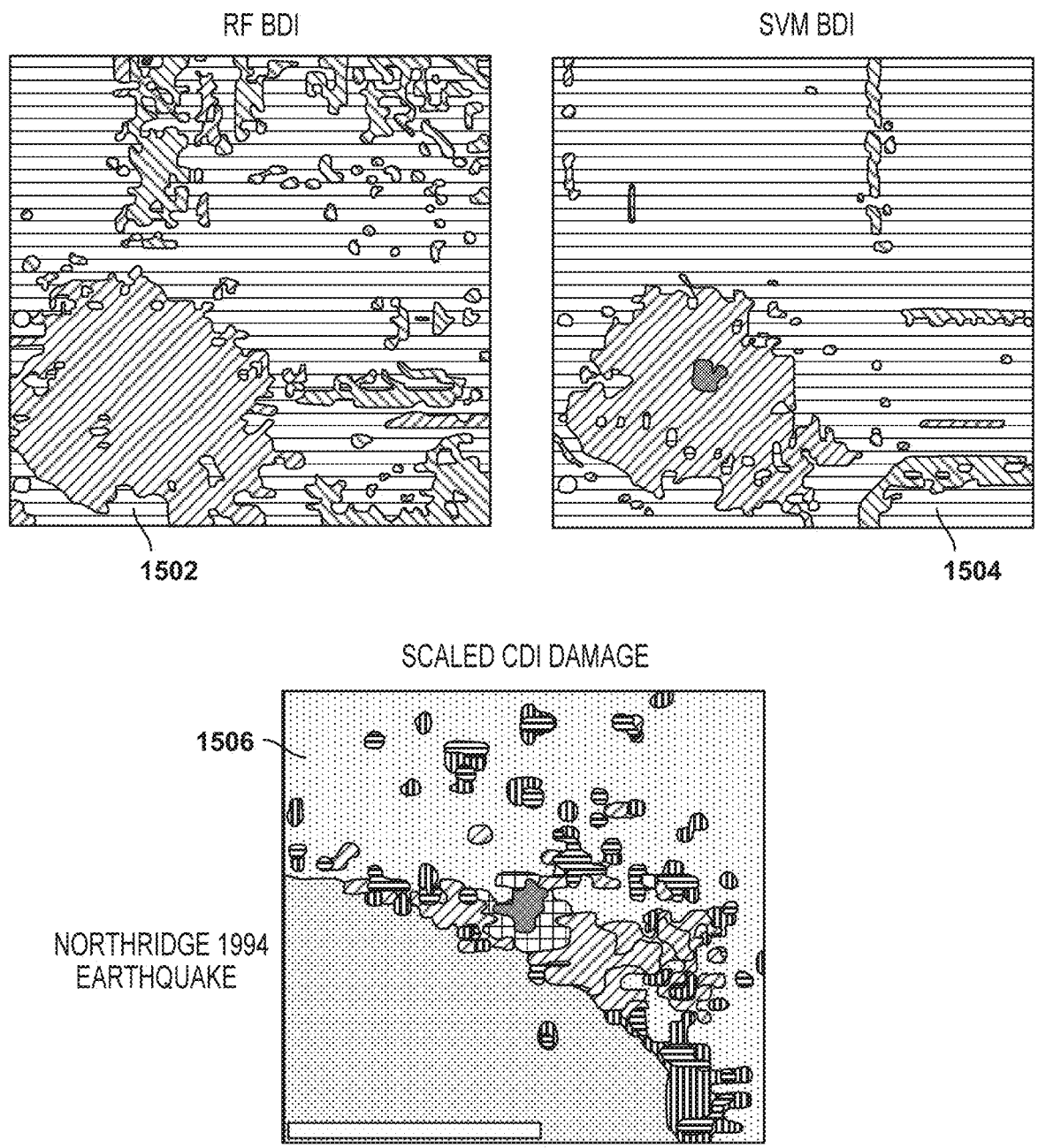
FIG. 15 shows example embodiments of screenshots of damage from the Northridge 1994 earthquake.

FIG. 15 shows example embodiments of screenshots of damage from the Northridge 1994 earthquake. Further, in an example embodiment, a visual comparison is performed to visually compare DYFI CDIs (e.g., scaled from 0-3) with predicted BDIs.

The RF BDI 1502 and SVM BDI 1504 are compared to the scaled CDI damage 1506. In this example embodiment, the SVM BDI 1504 plot predicted smoother boundaries with fewer outliers, especially in the lower damage states. Thus, in an example embodiment, the machine-learning model may supplement the knowledge gaps where DYFI data does not exist.

The example scaled CDI damage 1506 for DYFI data is not very extensive, and thus it is somewhat difficult to visually compare to the RF and SVM performance. In general, however, it appears that the trends between predicted and recorded damage are similar. It appears that the SVM BDI 1504 captures better the higher damage states near the epicenter.

Figure 16:
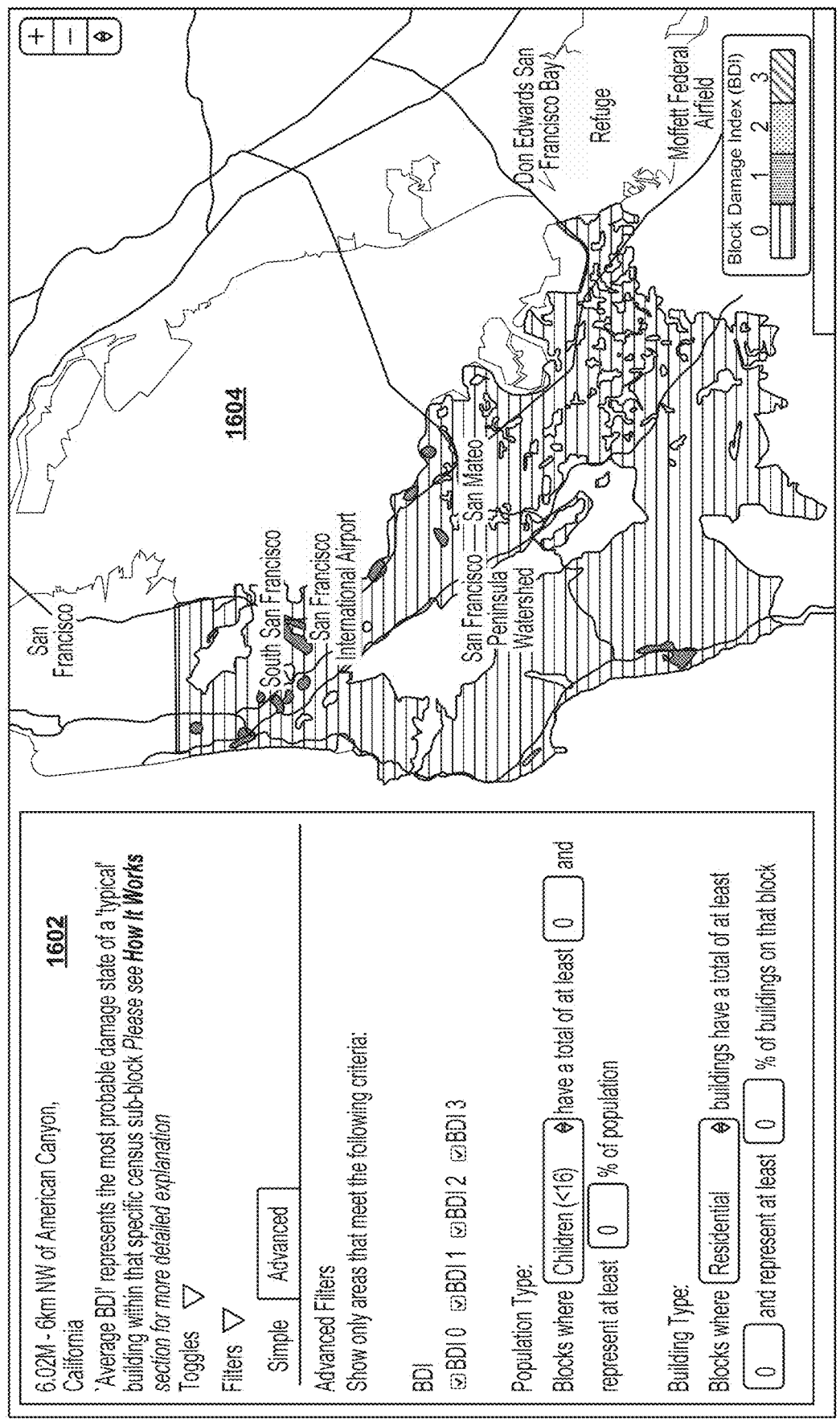
FIG. 16 is an example embodiment of a screenshot of a graphical user interface for presenting damage estimates in the region.

FIG. 16 is an example embodiment of a screenshot of a graphical user interface for presenting damage estimates in the region. FIG. 16 is part of the user interface of a tool for a community disaster-response center. In an example embodiment, a web application is provided to implement the machine-learning model described herein and make educated predictions with regard to the probable damage. In a basic embodiment of the website, a user requests a time slot when an administrator activates the background programs on the server that run on Rails, Python, Javascript, and other programming languages. In an example embodiment, two main modes of the application are provided, namely a homeowner mode and a community-disaster response-center mode.

Typically, the USGS publishes the ShakeMap within seconds after each event. In some example embodiments, the ShakeMap data may be uploaded directly without any pre-processing, and the damage-estimation tool may automatically consider the spectral acceleration (e.g., at 0.3 s). When the ShakeMap includes multiple spectral accelerations, the tuned model(s) learn which spectral accelerations most affect structures or structural features, such as building materials, age, height, etc.

In FIG. 16, map 1604 illustrates the damage estimates for a magnitude 6.02 earthquake. Some of the areas are not analyzed (e.g., wilderness areas with few or no structures), and the remaining areas are presented with color-coded BDI damage. The operator may zoom in or out to obtain better details on the desired area.

Input area 1602 provides filter options for selecting data. For example, a filter is provided to select the BDI category. An operator may select to view BDI 3 and get a quick view of the most damaged areas. Further, other filters are available, such as filters related to demographics or building types, etc. The operator may select blocks with at least 15 children, or blocks with at least 10% of seniors. This is useful, as seniors usually require more attention than non-seniors do.

Further, the operator may select to present blocks where residential structures are at least 50% of the total. This way, the operator may select between industrial and residential zones.

Demographics are important for the response-center operator, because it might be difficult to justify sending a response team just because a computer program estimated damage. However, having the additional demographics information enables the operator to make decisions to serve areas with high estimated damage and with a high number of senior residents.

Figure 17:
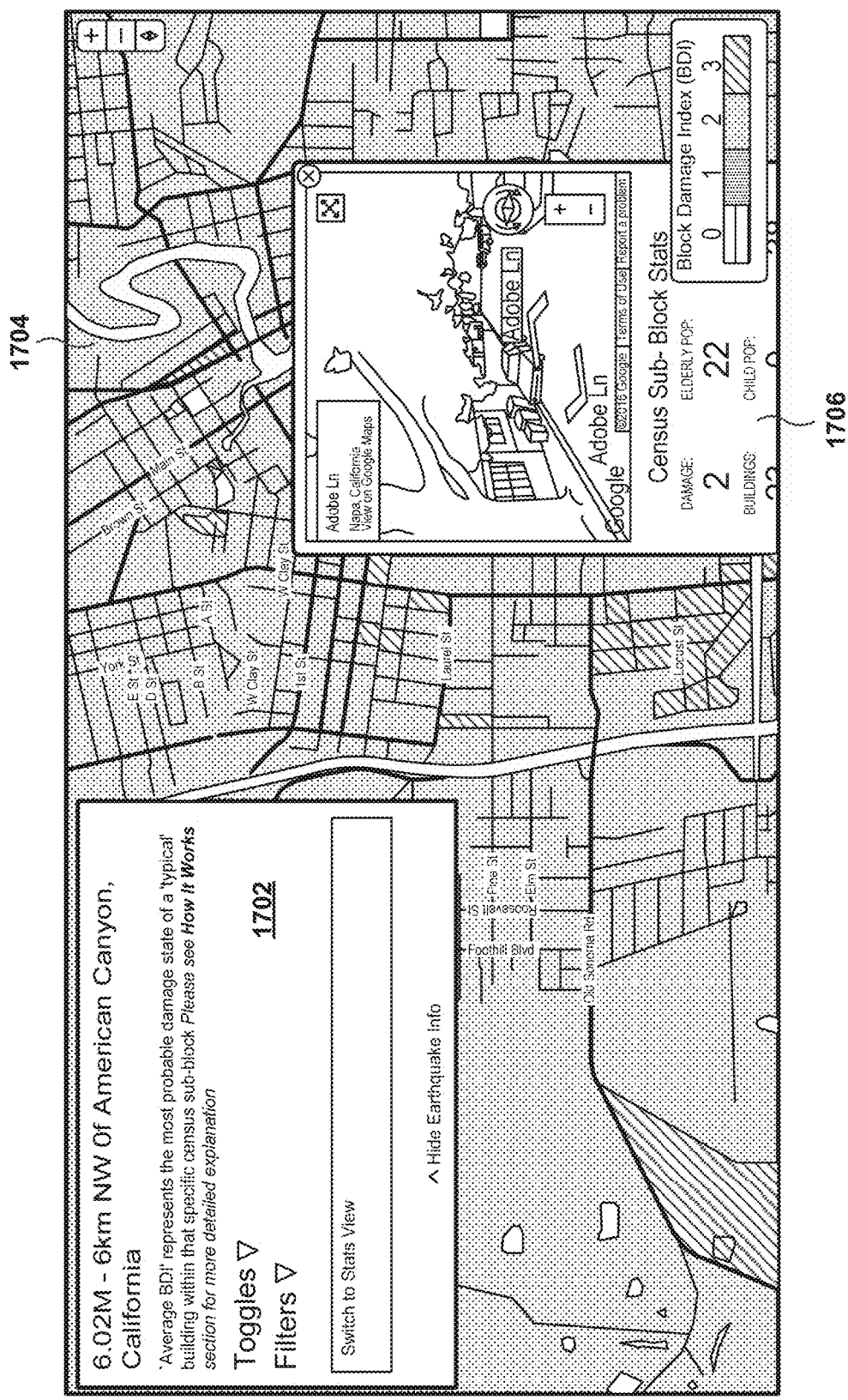
FIG. 17 is an example embodiment of a screenshot of a graphical user interface for presenting damage estimates in the region.

FIG. 17 is an example embodiment of a screenshot of a graphical user interface for presenting damage estimates in the region. Map 1704 shows a more detailed view of the earthquake area, which includes some BDI 3 areas and some BDI 2 areas. In addition, the operator may click on the map 1704 and obtain a street view 1706 of the area, which may be useful when interacting with the response teams.

It is noted that if the operator switches to a statistical view, the damage-estimation tool will present statistics for a selected block or area, such as population, average building age, population density, etc.

Another feature used for estimating damage is called after-shock treatment, which includes considering previous damage data associated with an earlier event. For example, on a certain day a 6.0 earthquake occurs, which results in damage for a particular building, such as broken windows. The next day, there is a 6.0 earthquake, but the particular building may be more susceptible to damage because of the earlier earthquake. The building then suffers additional damage, which would be more damage than if the previous earthquake hadn't occurred.

Since the algorithm takes into consideration the previous damage that compromised the building, the fragility function for the building is changed. In some example embodiments, the fragility function for the building is changed to increase the probability of damage.

In some example embodiments, a technique called belief propagation is used to improve the damage-estimation accuracy. Belief propagation takes into consideration additional data gathered after the event, which is fed to the algorithm to improve its accuracy. For example, after the earthquake, an emergency manager goes to the field and gathers data about actual damage to buildings, then sends the data back to the operator managing the damage estimation algorithms or uploads the data manually or automatically through an electronic application, text message, etc.

For example, a damage of 2 was estimated for a building, but the building inspector indicates that the damage is a 3. The damage-estimation program then changes the label from 2 to 3 for that building, and this additional information is propagated through neighboring buildings, thereby improving the accuracy of prediction for the neighboring buildings. This new data improves the algorithm estimation capability. For example, the algorithm's accuracy may be improved by 5% to 10%, so after a few hours, the accuracy of damage estimation may be up to 90 to 95%. Further, once a building has been repaired, the fragility function of the building returns to its original state.

Figure 18:
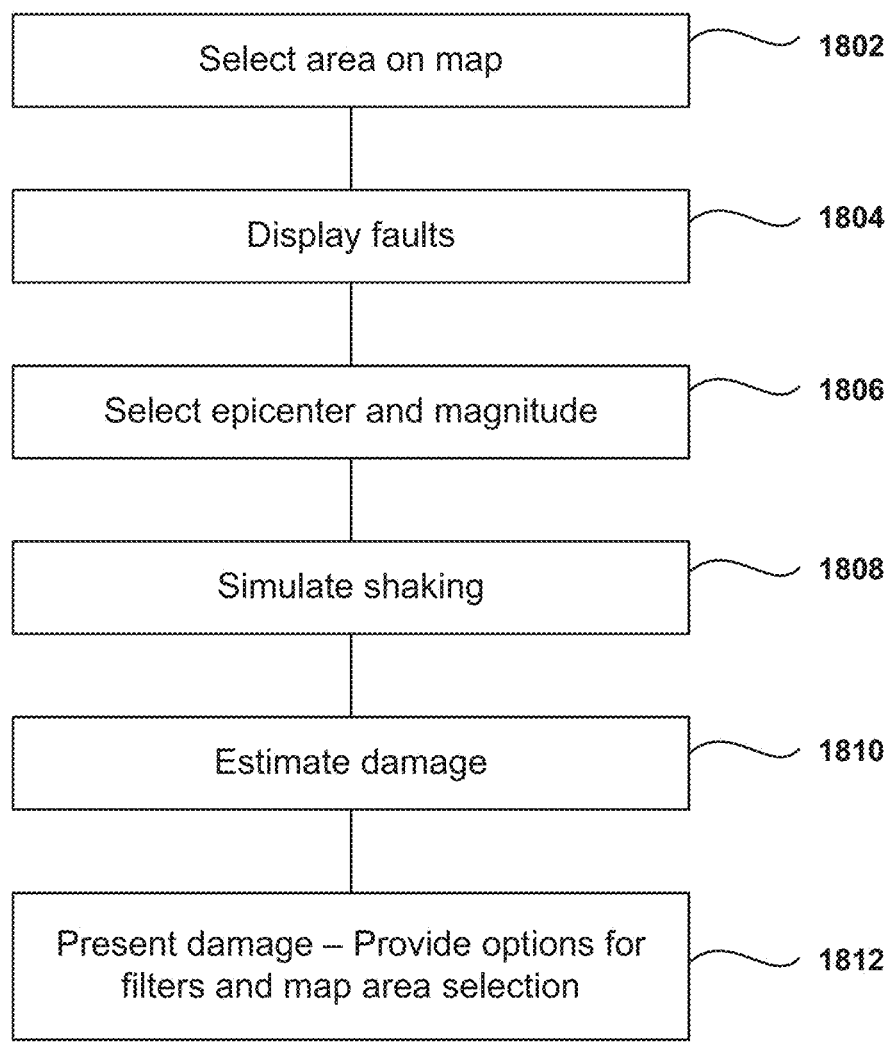
FIG. 18 is a flowchart of a method, according to some example embodiments, for performing damage simulations.

FIG. 18 is a flowchart of a method, according to some example embodiments, for performing damage simulations. While the various operations in this flowchart are presented and described sequentially, one of ordinary skill will appreciate that some or all of the operations may be executed in a different order, be combined or omitted, or be executed in parallel.

In some example embodiments, simulations are performed to estimate damage caused by a hypothetical earthquake. For example, shaking data is simulated, and the corresponding ShakeMap data is created, which is then inputted to the algorithm. Further, a model is created and an estimate of damage is presented.

Simulating damage is an important feature for response managers because it allows the managers to plan for different catastrophic events. By knowing what could happen, the manager is able to prepare plans for a response (e.g., capacity planning) or for retrofitting at-risk buildings. The damage-simulation tool is also useful for training because it enables training exercises based on the hypothetical effects of a catastrophe.

In operation 1802, according to an example embodiment, a map is presented on the damage-simulation tool, and the operator is able to select an area on the map where the epicenter will be located. From operation 1802, the method flows to operation 1804 where the earthquake faults are presented on the map. In addition, the tool presents what is the maximum magnitude estimated for each fault.

In operation 1806, input is received of a selection by the operator for the location and magnitude of the earthquake. In operation 1808, shaking data is simulated for the selected earthquake. Shaking may be predicted at one or more points in each block that is expected to feel shaking above a prescribed threshold. The shaking may be predicted using one or a combination of several, ground motion prediction equations (GMPEs). GMPEs incorporate natural features about the soil, distance to a fault, depth of rupture, etc., to estimate the intensity of ground shaking from an earthquake at a particular location of a particular magnitude.

From operation 1808, the method flows to operation 1810, where the damage is estimated, as described above. In operation 1812, the estimate or prediction of damage is presented, and the operator is provided with a similar interface as in the case of a real earthquake. The operator is able to see where the areas with high estimated damage are situated. In addition, the operator may apply filters to obtain statistical data regarding demographics, or some other type of filter.

The results may be used for areas where retrofitting laws should be enforced because there is a higher risk, or the results may assist the manager to select a location for a hospital, such as by placing the hospital close to high-risk areas. Further, the results may also be used to calculate insurance premiums and deductibles based on location-specific risk, and to conduct capacity analysis of existing resources, such as determining the maximum earthquake magnitude the city may sustain before a particular hospital is overwhelmed with patients, and determining the impact on city-wide emergency response if one hospital collapses during an earthquake (resiliency checking).

Figure 19:
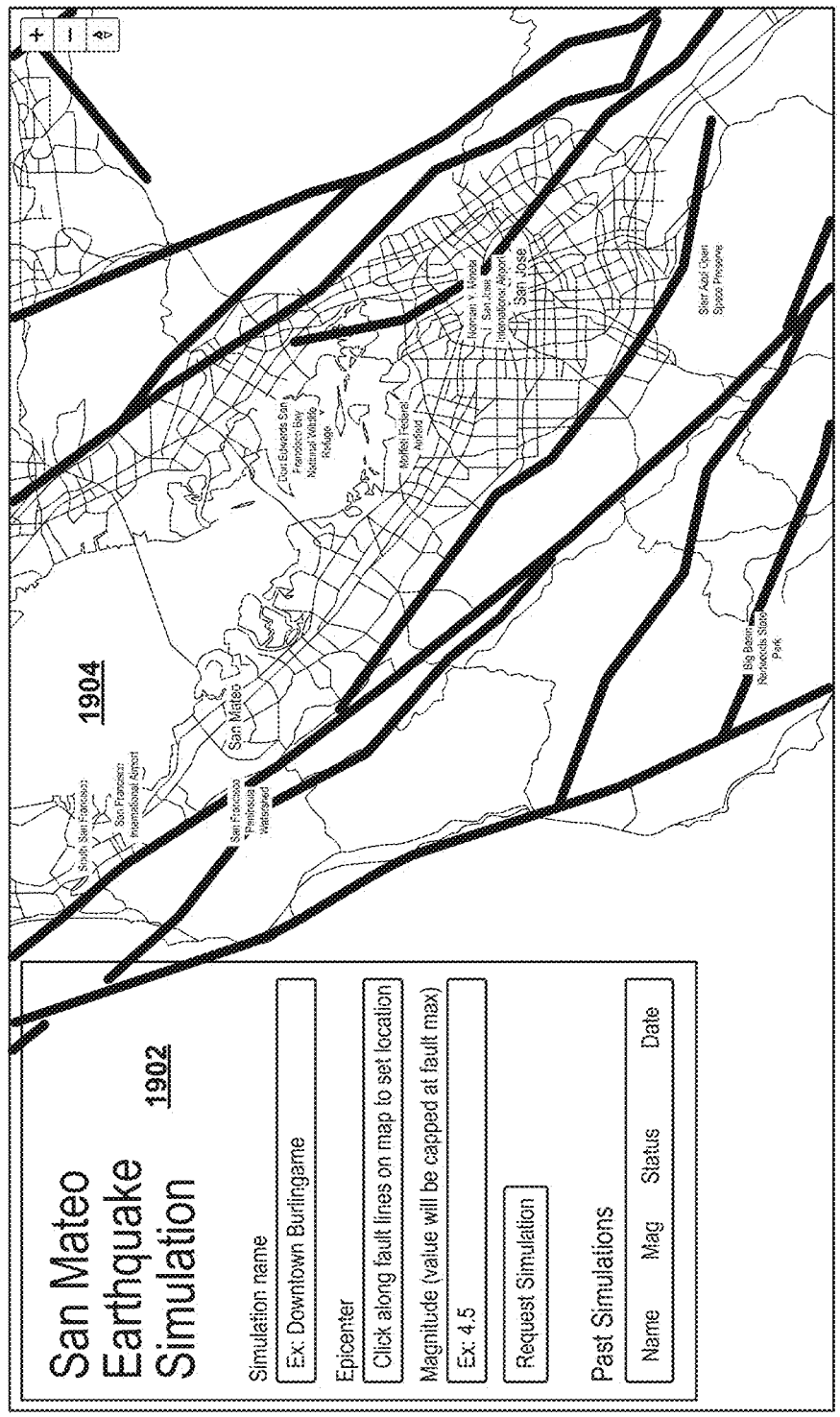
FIG. 19 is an example embodiment of a screenshot of an interface showing earthquake faults.

FIG. 19 is an example embodiment of a screenshot of an interface showing earthquake faults. After the operator selects a region in input area 1902, map 1904 shows the area and the earthquake faults in the area. If the operator runs the cursor over the fault, additional information is provided, such as the name of the fault, the maximum magnitude detected on the fault, and the maximum estimated magnitude earthquake that the fault may generate. The purpose of providing the maximum magnitude is to perform realistic simulations, instead of providing estimates for unlikely scenarios.

Figure 20:
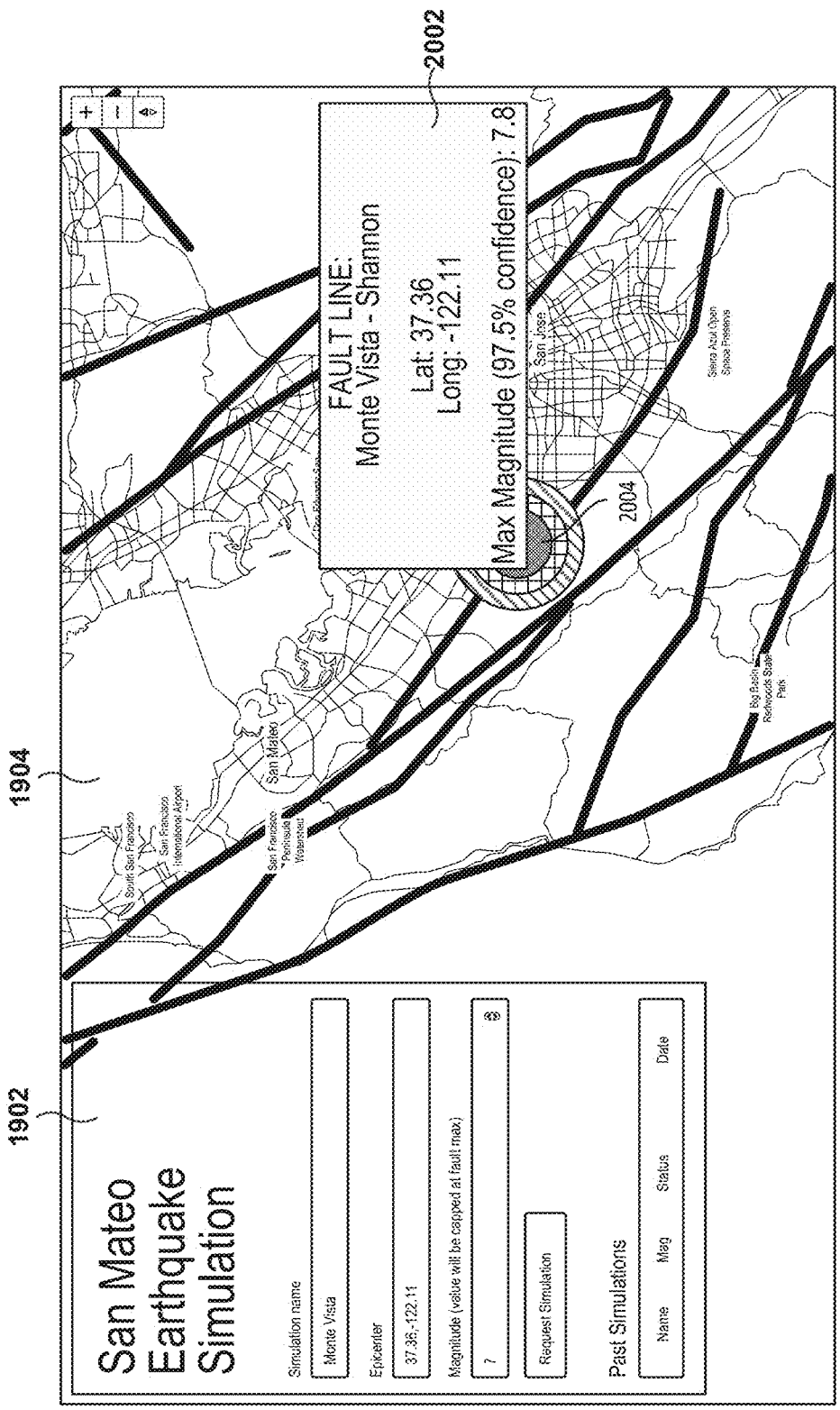
FIG. 20 is an example embodiment of a screenshot of an interface for selecting the location and magnitude of an earthquake.

FIG. 20 is an example embodiment of a screenshot of an interface for selecting the location and magnitude of an earthquake. After the operator selects the epicenter, a graphical display 2004 is presented to indicate the location of the earthquake. In addition, the latitude and longitude are presented. When the operator selects the button labeled "Request Simulation," the simulation is started. Within a few minutes, the simulation is completed, and damage predictions are presented.

Figure 21:
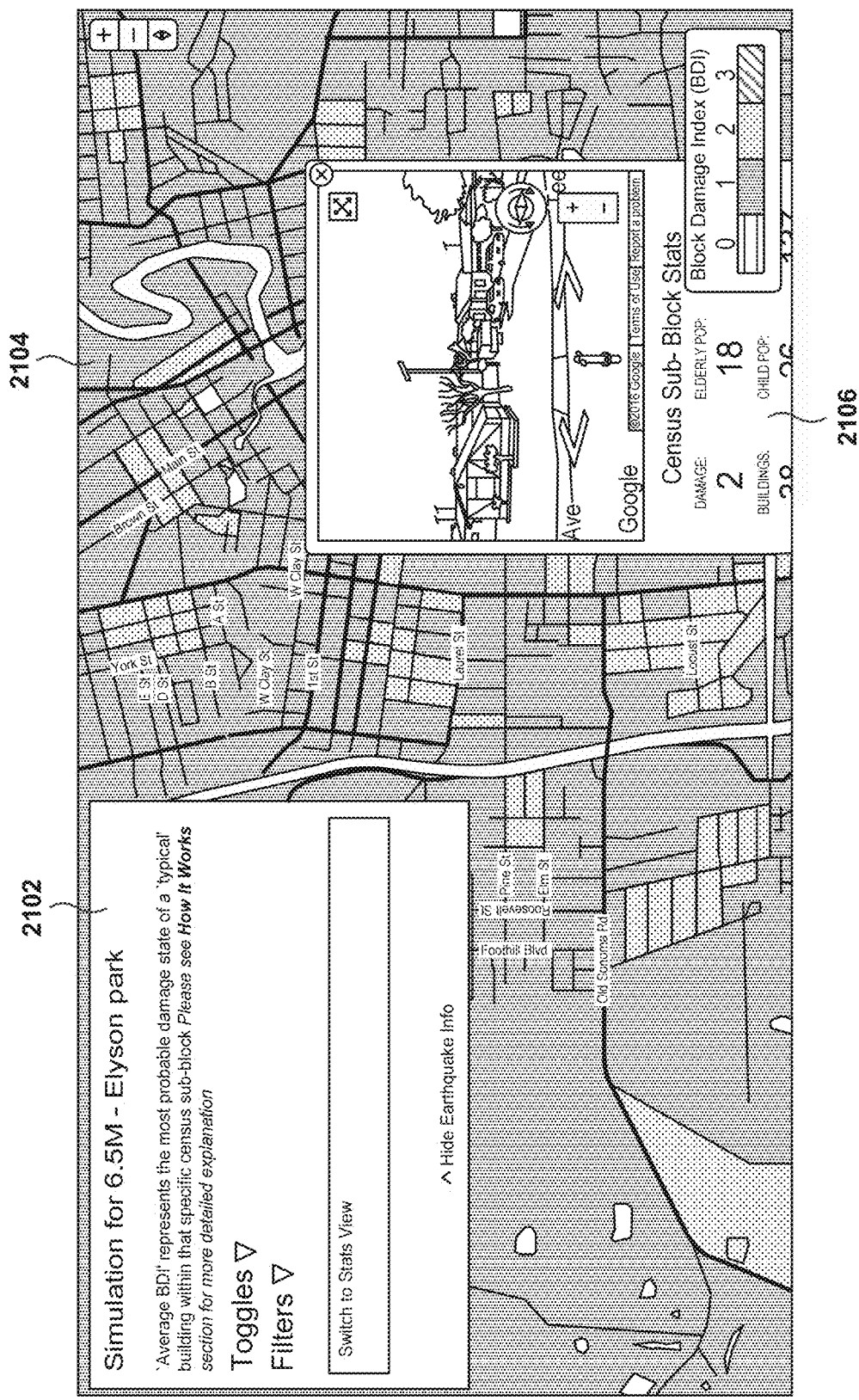
FIG. 21 is an example embodiment of a screenshot of a user interface for presenting simulation data by city block.

FIG. 21 is an example embodiment of a screenshot of a user interface for presenting simulation data by city block. The information presented for simulation is very similar to the user interface for estimating damage after a real earthquake shown in FIG. 16. The interface includes a filter area 2102, a color-coded map 2104, and an optional street view 2106.

As in the case of the real earthquake, the operator may enter filters and use the different options to obtain additional information, or focus on specific damage data, such as areas with a BDI of 3.

FIG. 22 illustrates several damage tables by demographic, according to some example embodiments. FIG. 22 shows an example user interface presented when the user selects to obtain statistical data. The statistical data may include table 2202 for household income levels. The table 2202 indicates how many buildings are associated with a particular damage index within a particular income level. There is one row for each BDI level, and one column for each income level (e.g., less than 10K, 10K-30K, 30K-50K, etc.). The statistical data may also include statistics relating to difference between current and previous earthquakes, statistics relating to damage compared to neighboring structures, etc.

Table 2208 provides statistics according to age group. Three columns divide the age groups into children 16 years old or less, adults between 60 and 65 years old, and seniors at least 65 years old. Each row is for one type of BDI damage level.

Table 2204 provides statistical information according to building age. Again, each row corresponds to one of the BDI levels, and each column is for a period when the structure was built. For example, the columns include buildings built before 1940, or built between 1940 and 1959, etc. In each cell, two values are provided: the number of buildings and the percentage of buildings of this age within the BDI damage class.

Table 2206 provides statistical data according to building type: residential, commercial, or government. In this table, each BDI class is associated with a column, and the building type with each row. The value in each cell identifies the count of buildings for this particular BDI damage. Table 2210 provides statistical information regarding resident population, each column being associated with a BDI class, and each row being associated with a type of resident.

FIG. 23 illustrates the details provided for a special building, according to some example embodiments. The response-center manager may identify special buildings that require special tracking, such as hospitals, City Hall, fire stations, etc. The operator is able to enter additional information for these buildings, including type of construction, age, contact person, etc. For these important buildings, the tool calculates a building-damage estimate instead of just the city-block level estimate.

The tool provides specific damage information for these special buildings. FIG. 23 illustrates the information presented when the manager clicks on the building. In some embodiments, the information presented 2300 includes the name of the building, the address, a damage estimate, and confidence levels for the different types of damage. In the example embodiment of FIG. 23, the damage is estimated in category 0 with a 71% probability, and in category 1 with a 29% probability.

FIG. 24 shows an example embodiment of a screenshot of a GUI accessible via a website to enter data regarding a building structure (e.g., a dwelling). FIG. 24 illustrates a sample homeowner module.

An average homeowner may know little about earthquake engineering, but may be interested in risk exposure. Accordingly, user inputs provided by the web application may be few, and typically within homeowner knowledge.

An input zone shows fields for a user (e.g., homeowner) to enter information relevant to the physical structure or the contents thereof. This may be accomplished by the "Prediction form". The method and systems described herein may then be performed (e.g., by a remote server) to provide prediction results.

In an example embodiment, the website may allow the user to input home location, replacement value of the home (which includes structural and non-structural components, but not property value), the replacement value of contents, or the like. The website may make four BDI predictions using Sa intensities from the hazard curve corresponding to re-turn periods of 2475, 475, 50, and 20 years. The algorithm may make 10 predictions per hazard level, takes the mean BDI, and rounds to the nearest whole number. For example, to determine loss calculations, the method or functionality included in the website takes a weighted average of all 10 iterations. Moreover, the user may also get an idea of the potential losses, which the user could face annually, as well as recovery time for all four hazard levels. This information could be useful in household financial planning in order to protect assets against seismic risk.

Figure 25:
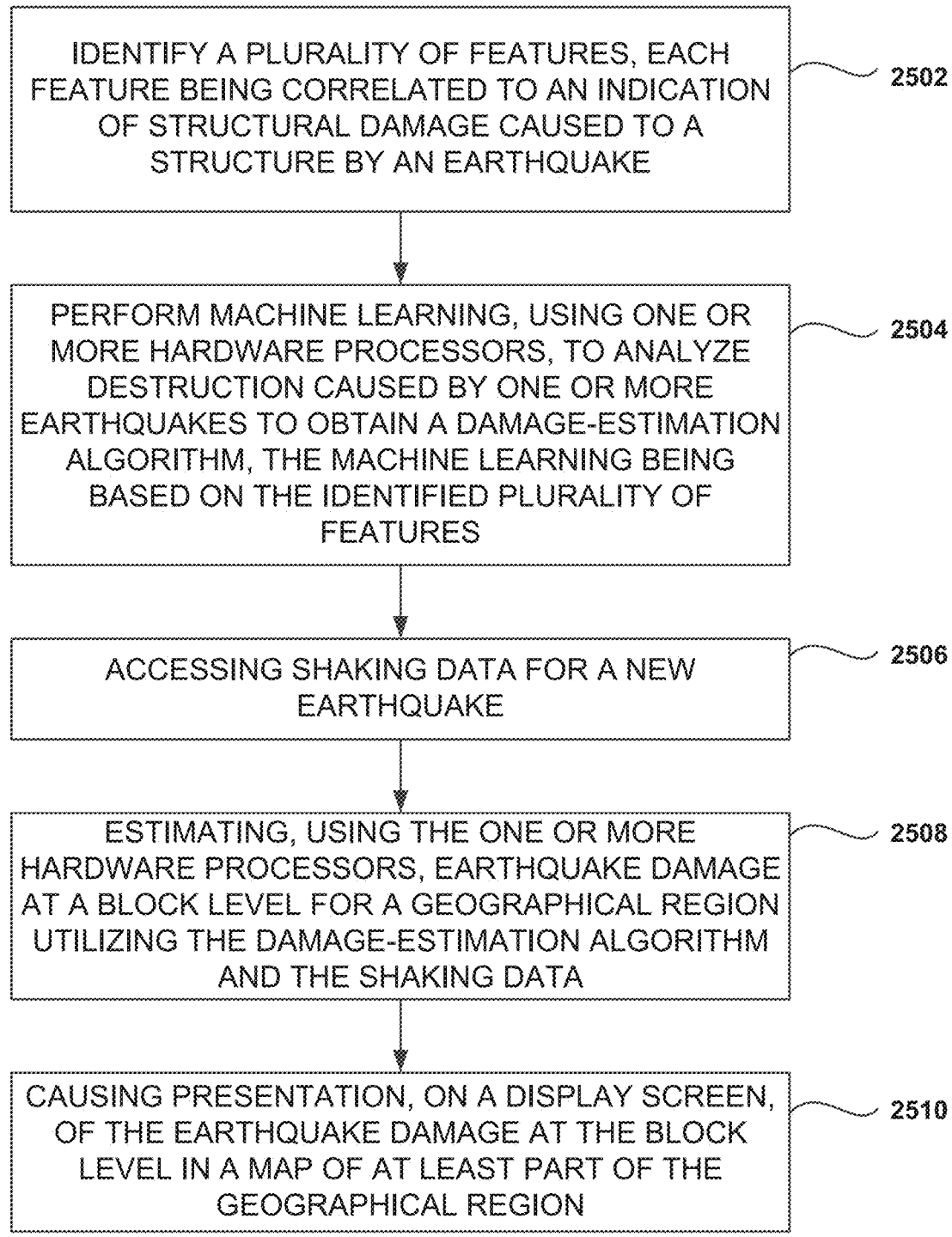
FIG. 25 is a flowchart of a method, according to some example embodiments, for predicting the scale and scope of damage after an earthquake.

FIG. 25 is a flowchart of a method, according to some example embodiments, for predicting the scale and scope of damage after an earthquake. While the various operations in this flowchart are presented and described sequentially, one of ordinary skill will appreciate that some or all of the operations may be executed in a different order, be combined or omitted, or be executed in parallel.

Operation 2502 is for identifying a plurality of features, each feature being correlated to an indication of structural damage caused to a structure by an earthquake. From operation 2502, the method flows to operation 2504 where machine learning is performed, using one or more hardware processors, to analyze destruction caused by one or more earthquakes to obtain a damage-estimation algorithm, the machine learning being based on the identified plurality of features.

From operation 2504, the method flows to operation 2506 for accessing shaking data for a new earthquake. In operation 2508, earthquake damage is estimated, using the one or more hardware processors, at a block level for a geographical region utilizing the damage-estimation algorithm and the shaking data.

From operation 2508, the method flows to operation 2510 for causing presentation, on a display screen, of the earthquake damage at the block level in a map of at least part of the geographical region.

In some implementations, estimating earthquake damage at a block level includes performing statistical analysis of the structures for each block based on features of structures in the block, and estimating the earthquake damage at the block level based on the statistical analysis of the structures in each block.

In some example embodiments, the plurality of features are classified into built environment, natural environment, or sensor data. The built environment is for structures that have been built, the natural environment is for structures occurring in nature, and the instantaneous line includes shaking data from one or more sensors in one or more locations.

In some example embodiments, built environment features include one or more of structure location, structure size, structure prize, year built, number of stories, commercial or residential structure, building material of structure, chimney present, and number of stories. Further, natural environment features include one or more of soil type, soil density, soil liquefaction, elevation, and water table. The instantaneous line features include one or more of earthquake magnitude, duration of earthquake, earthquake epicenter, spectral acceleration, and spectral displacement.

In some example embodiments, the method further includes determining an accuracy of a plurality of machine-learning algorithms, and selecting the machine-learning algorithm with the best accuracy.

In some example embodiments, accessing shaking data further includes receiving ShakeMap information from the USGS after the new earthquake, accessing damage inspection data after the new earthquake, inputting the obtained damage inspection data to the damage-estimation algorithm, and re-estimating earthquake damage after inputting the obtained damage inspection data.

In some example embodiments, the plurality of features include a fragility curve for a structure based on construction material, size, seismic zone, and seismic design code. In other example embodiments, the earthquake damage at the block level is presented within a user interface of a disaster-response-center module.

In some example embodiments, the method also includes estimating financial loss of a first structure based on estimated earthquake damage to the first structure and a replacement value of the first structure. In some example embodiments, performing machine learning to analyze the destruction by one or more earthquakes further includes applying a transfer-learning operation to apply data from an event in a first geographical area to an event in a second geographical area. In some example embodiments, the earthquake damage includes classifying each block at one of four damage states. In some example embodiments, each block corresponds to a census block that has been defined by the United States Census Bureau. In some example embodiments, BDIs, and other damage or financial loss predictions, may be reported in the form or a report in addition to, or in lieu of, a map.

Figure 26:
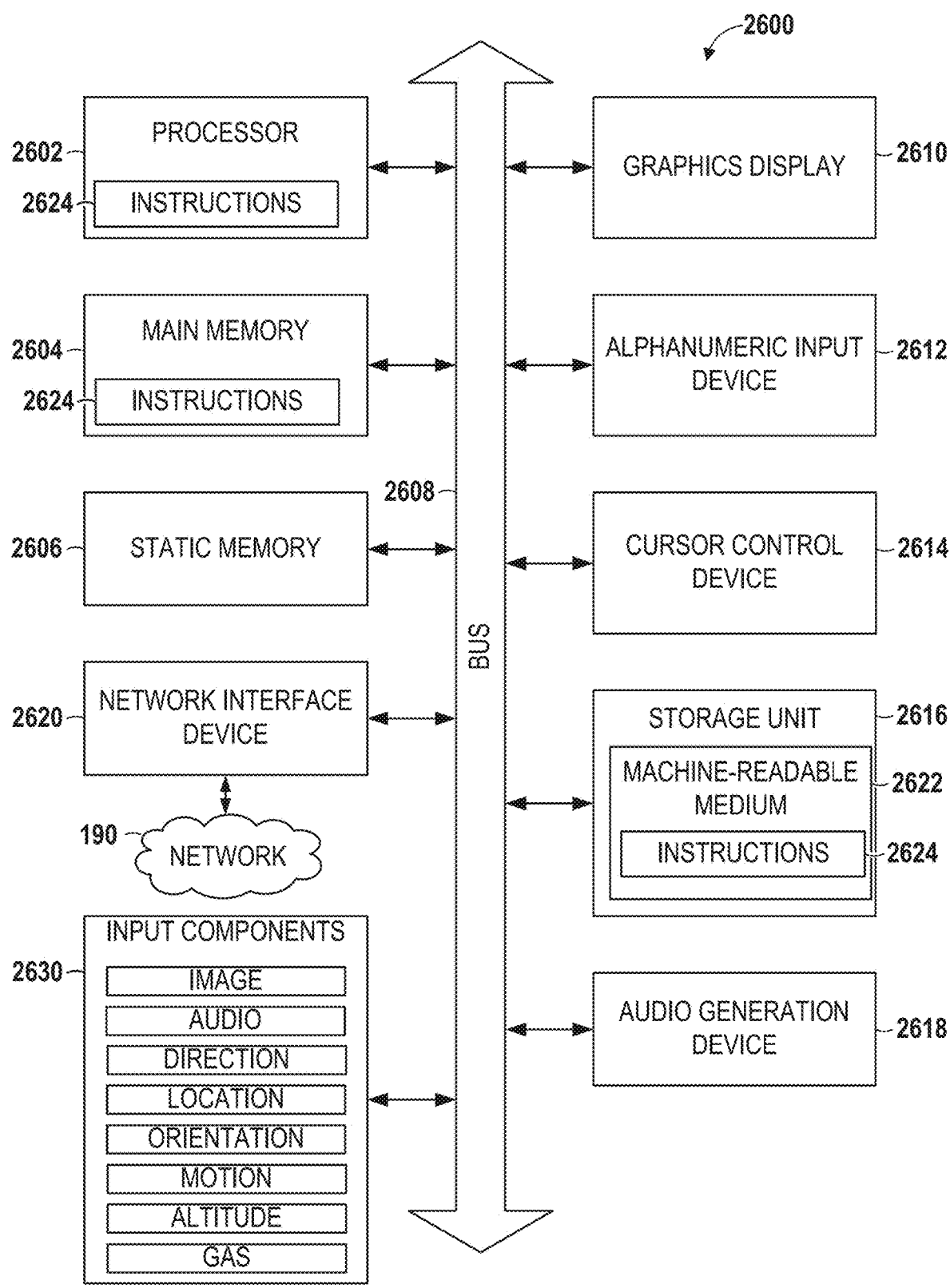
FIG. 26 is a block diagram illustrating components of a machine, according to some example embodiments, able to read instructions from a machine-readable medium and perform any one or more of the methodologies discussed herein.

FIG. 26 is a block diagram illustrating components of a machine 2600, according to some example embodiments, able to read instructions 2624 from a machine-readable medium 2622 (e.g., a non-transitory machine-readable medium, a machine-readable storage medium, a computer-readable storage medium, or any suitable combination thereof) and perform any one or more of the methodologies discussed herein, in whole or in part.

Specifically, FIG. 26 shows the machine 2600 in the example form of a computer system (e.g., a computer) within which the instructions 2624 (e.g., software, a program, an application, an applet, an app, or other executable code) for causing the machine 2600 to perform any one or more of the methodologies discussed herein may be executed, in whole or in part.

In alternative embodiments, the machine 2600 operates as a standalone device or may be connected (e.g., networked) to other machines. In a networked deployment, the machine 2600 may operate in the capacity of a server machine or a client machine in a server-client network environment, or as a peer machine in a distributed (e.g., peer-to-peer) network environment. The machine 2600 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 2624, sequentially or otherwise, that specify actions to be taken by that machine. Further, while only a single machine is illustrated, the term "machine" shall also be taken to include any collection of machines that individually or jointly execute the instructions 2624 to perform all or part of any one or more of the methodologies discussed herein.

The machine 2600 may include one or more of a processor 2602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 2604, and a static memory 2606, which are configured to communicate with each other via a bus 2608. The processor 2602 may contain microcircuits that are configurable, temporarily or permanently, by some or all of the instructions 2624 such that the processor 2602 is configurable to perform any one or more of the methodologies described herein, in whole or in part. For example, a set of one or more microcircuits of the processor 2602 may be configurable to execute one or more modules (e.g., software modules) described herein.

The machine 2600 may further include a graphics display 2610 (e.g., a plasma display panel (PDP), a light emitting diode (LED) display, a liquid crystal display (LCD), a projector, a cathode ray tube (CRT), or any other display capable of displaying graphics or video). The machine 2600 may also include an alphanumeric input device 2612 (e.g., a keyboard or keypad), a cursor control device 2614 (e.g., a mouse, a touchpad, a trackball, a joystick, a motion sensor, an eye tracking device, or other pointing instrument), a storage unit 2616, an audio generation device 2618 (e.g., a sound card, an amplifier, a speaker, a headphone jack, or any suitable combination thereof), and a network interface device 2620.

The storage unit 2616 includes the machine-readable medium 2622 (e.g., a tangible and non-transitory machine-readable storage medium) on which are stored the instructions 2624 embodying any one or more of the methodologies or functions described herein. The instructions 2624 may also reside, completely or at least partially, within the main memory 2604, within the processor 2602 (e.g., within the processor's cache memory), or both, before or during execution thereof by the machine 2600. Accordingly, the main memory 2604 and the processor 2602 may be considered machine-readable media (e.g., tangible and non-transitory machine-readable media). The instructions 2624 may be transmitted or received over the network 190 via the network interface device 2620. For example, the network interface device 2620 may communicate the instructions 2624 using any one or more transfer protocols (e.g., hypertext transfer protocol (HTTP)).

In some example embodiments, the machine 2600 may be a portable computing device, such as a smart phone or tablet computer, and have one or more additional input components 2630 (e.g., sensors or gauges). Examples of such input components 2630 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of the input components 2630 may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2622 is shown in an example embodiment to be a single medium, the term "machine-readable medium" should be taken to include a single medium or multiple media (e.g., a centralized or distributed database, or associated caches and servers) able to store instructions 2624. The term "machine-readable medium" shall also be taken to include any medium, or combination of multiple media, that is capable of storing the instructions 2624 for execution by the machine 2600, such that the instructions 2624, when executed by one or more processors of the machine 2600 (e.g., processor 2602), cause the machine 2600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Figure 27:
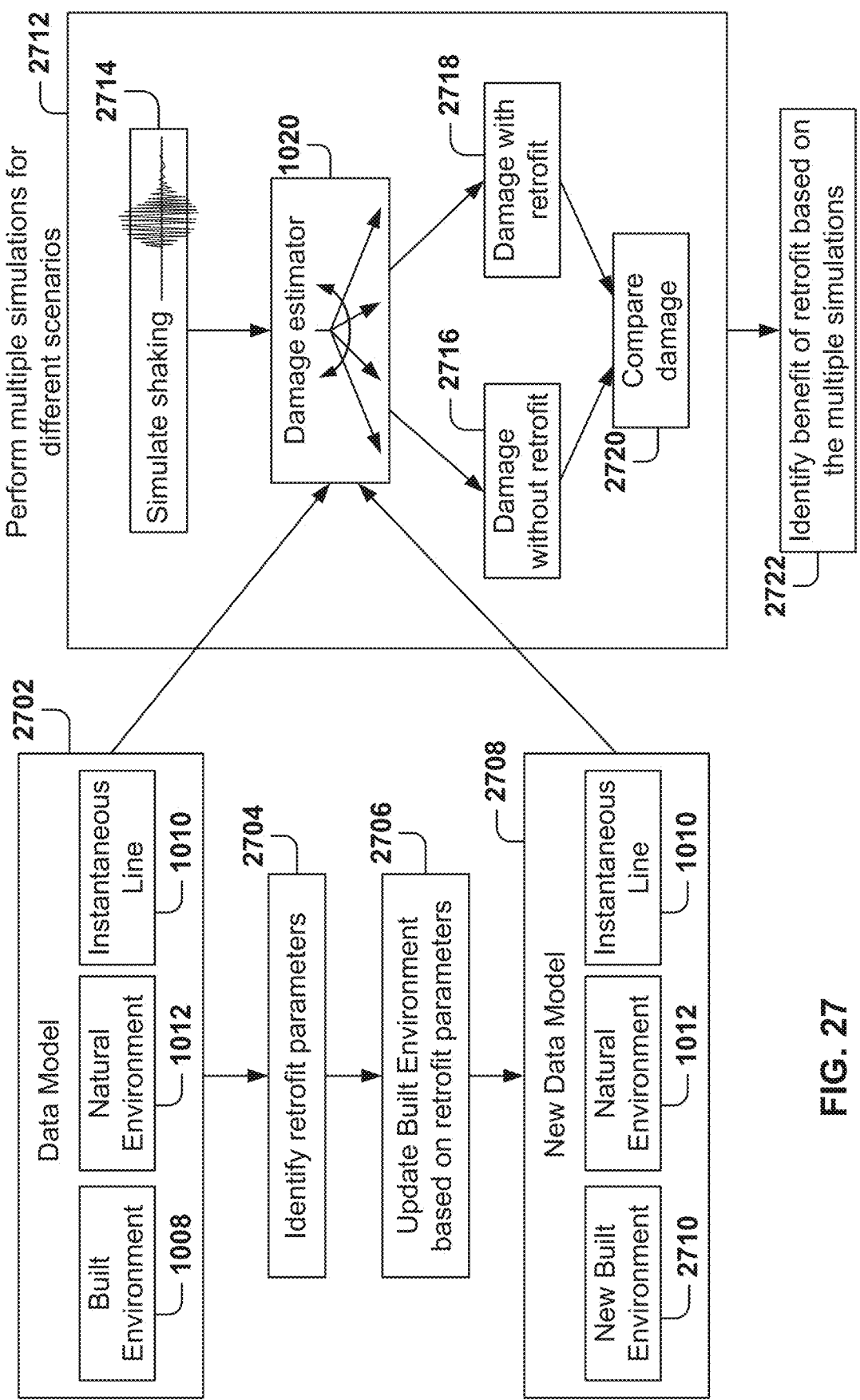
FIG. 27 is a diagram illustrating the determination of the benefit of a retrofit for damage prevention, according to some example embodiments.

FIG. 27 is a diagram illustrating the determination of the benefit of a retrofit for damage prevention, according to some example embodiments. A retrofit measure, as used herein, is an alteration made to a built structure that decreases a probability of damage to the built structure after an earthquake or other catastrophic event. In particular, a seismic retrofit is the modification of existing structures to make the structures more resistant to seismic activity, ground motion, or soil failure due to earthquakes.

There are several ways to retrofit a building, such as cripple-wall bracing, lateral bracing, foundation bolting, bolting replacement, anchoring to a mud sill, external post-tensioning, installing base isolators, adding supplementary dampers, adding structural support, reinforcing the exterior, adding exterior concrete columns, and others.

The mayor of a city may be considering incentivizing homeowners to do building retrofits, but the mayor wants to maximize the benefit of the investment of the money spent towards retrofitting buildings in the city. The mayor would like to know what the critical buildings with highest risk of damage are, what potential retrofit measures will provide the biggest return, how much money will be saved because of retrofitting in case of an earthquake, etc.

The damage prediction system gives the ability to answer some of the issues concerning the mayor by identifying high-risk buildings, assessing the damage to a building with and without a retrofit to provide a benefit value, identifying the benefit associated with a retrofit measure, etc. For example, the damage prediction system may analyze how much the buildings in the region could benefit from lateral bracing, and how the damage from a potential earthquake will be diminished if lateral bracing is added to the buildings.

As discussed above with reference to FIGS. 10-11, a data model 2702 includes built environment data 1008, natural environment data 1012, and instantaneous line data 1010. In some example embodiments, the data model 2702 is used to generate a damage prediction value in the range from 0 to 3, where 0 means no damage and 3 means total collapse of the structure. In other example embodiments, different damage prediction values may be utilized. These damage prediction values are tied to the latitude and longitude of the structure, as well as the event that generated the shaking.

In many cases, the built environment data 1008 is refreshed periodically, such as once a year, with live updates that indicate changes to the buildings in the area, such as repairs, retrofits, upgrades, etc. The natural environment data 1012 may be updated, for example, as portions of soil near the coast become more or less saturated with the changing tides, and the instantaneous line data 1010 may be updated as the sensor data is processed and refined. In general, however, the natural environment data 1012 and instantaneous line data 1010 are not fundamentally altered in real time.

At operation 2704, parameters for the retrofit are identified. These parameters include the nature of the retrofit, the cost, and how the retrofit will be applied. At operation 2706, the built environment data 1008 is updated based on the retrofit parameters to create new built environment data 2710. As a result, a new data model 2708 is created for estimating damage after applying the retrofit measures. More details are provided below with reference to FIG. 28 regarding the updating of the built environment data 1008.

The retrofit measures may include one or more actions on the building, for example replacing foundation balls and adding lateral bracing. Each retrofit measure changes the fragility curves, and the probability of damage decreases as the retrofit measures are applied. It is to be noted that the retrofit analysis may be performed for a single building, for a category of buildings, or for a set of defined buildings within the region. For example, the analysis may include determining what would happen if all masonry buildings in the region were retrofitted with lateral bracing.

In some example embodiments, several simulations 2712 are performed under different scenarios to calculate the benefit provided by the retrofit in each of the scenarios. Typically, the simulations 2712 cover probable earthquake scenarios based on experience and predictions from experts. In other example embodiments, a single scenario is used to identify the benefit (e.g., what would be the benefit if there was a 6.2-magnitude earthquake at a given location in the Loma Prieta fault?).

Each scenario has corresponding simulated shaking data 2714. The machine-learning algorithm for estimating damage calculates two different types of damage. A first damage 2716 is the damage caused to buildings without the retrofit measures, and a second damage 2718 is the damage caused to the buildings after applying the retrofit measures.

At operation 2720, the two damages are compared to identify the difference in damage because of the retrofit. For example, the first damage 2716 may be $100,000 worth of damages to the building because of the earthquake and the second damage 2718 may be $5,000 worth of damages to the building with the retrofit. Therefore, the benefit of the retrofit in case of an earthquake is $95,000. In addition, a benefit/cost ratio may be calculated; if the retrofit costs $10,000, then the benefit/cost ratio is 95,000 divided by 10,000, or a benefit of 9.5 times the cost.

At operation 2722, the data from the multiple simulations 2712 is aggregated in order to identify a representative benefit associated with the retrofit. Assuming that the retrofit cost is the same for all simulations, the damage difference for all the simulations is aggregated, such as by calculating the average, calculating a weighted average based on the probability of each scenario, calculating a geometric mean, etc. The representative damage is then compared to the cost of the retrofit to identify the benefit/cost ratio.

Figure 28:
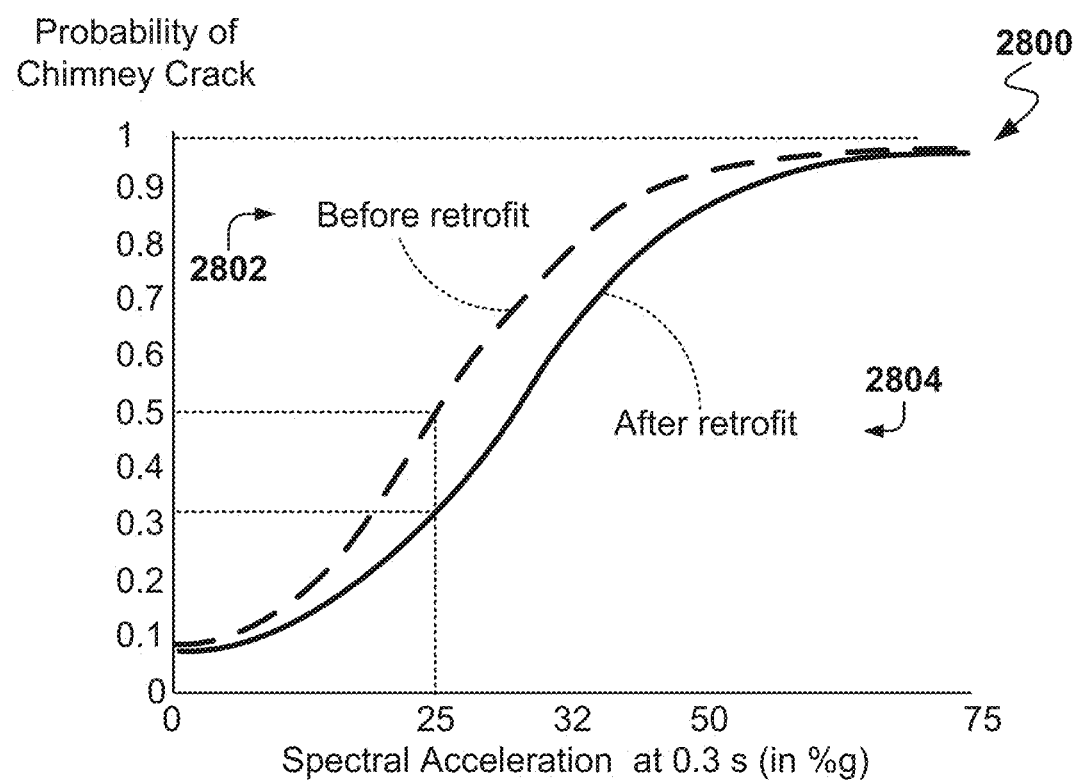
FIG. 28 illustrates the change of the fragility function because of the retrofit, according to some embodiments.

FIG. 28 illustrates a change of the fragility function because of the retrofit, according to some embodiments. The retrofit decreases the probability of damage after an earthquake. This means that the fragility functions for the building are changed to reflect the retrofit.

A chart 2800 illustrates fragility functions 2802 and 2804 before and after the retrofit, respectively, where the probability of damage (e.g., a chimney crack) depends on the spectral acceleration at the latitude and longitude where the building is situated. Embodiments presented herein are described with reference to one fragility function, but the same principles may be applied to all the features that define the built environment data for a particular structure. For example, there could be 20 features identified for calculating the damage to the building.

Thus, for a shaking of 0.25 g, the probability of a chimney cracking is equal to about 50% for the building without the retrofit in the example of the chart 2800. This fragility function 2802 is for a particular building type, such as a two-story wooden building built from 1950-1960.

As a consequence of the retrofit, the new fragility function 2804 is created in order to reflect the increased resilience of the building as a consequence of the retrofit. This means that if the building were to suffer the same shaking of 0.25 g after the retrofit, the probability of chimney cracking would be about 32%. Therefore, the probability of damage has changed from 50% to 32% for the same level of shaking.

In some example embodiments, the fragility function has a mean and a standard deviation, and the new fragility function 2804 has a greater mean than the original fragility function 2802 and a smaller standard deviation. Since the mean is higher, the fragility function has shifted towards the right, which means that the probability of damage is lower for the same level of shaking.

After the building is retrofitted, the new fragility function 2804 is determined for each of the applicable built environment features. In some example embodiments, a machine-learning algorithm is utilized to determine the new fragility function 2804 based on data from previous earthquakes.

There are several ways of creating the new fragility function 2804. In some example embodiments, the new fragility function 2804 is expressed as a combination of two or more fragility functions defined for different types of buildings. For example, the new fragility function 2804 is a combination of the fragility functions for types 14 and 15. In some embodiments, probabilities are assigned to each of the fragility functions used to form the combination. Each of the fragility functions is then assigned a weight in order to calculate the new fragility function 2804. For example, the new fragility function 2804 is a combination of the fragility function for type 14 with a probability of 60% and the fragility function for type 15 with a probability of 40%. Other embodiments may utilize more than two fragility functions to form the new fragility function 2804.

In other example embodiments, the fragility function is changed by applying a factor to the original fragility function 2802. For example, the new fragility function 2804 is equal to the original fragility function 2802 times 0.8, but other factors may also be utilized.

In some example embodiments, in order to determine how to change the fragility function because of a retrofit, an analysis is performed on actual earthquake damage and a comparison is made between buildings having a similar data model that are situated in similar areas (e.g., the same block), except that some buildings may have been retrofitted while other buildings have not been retrofitted. By analyzing the damage to the buildings with and without retrofits, it is possible to identify how the retrofit affects damage, and in turn, how it affects the fragility curves that determine the probability of damage.

Figure 29:
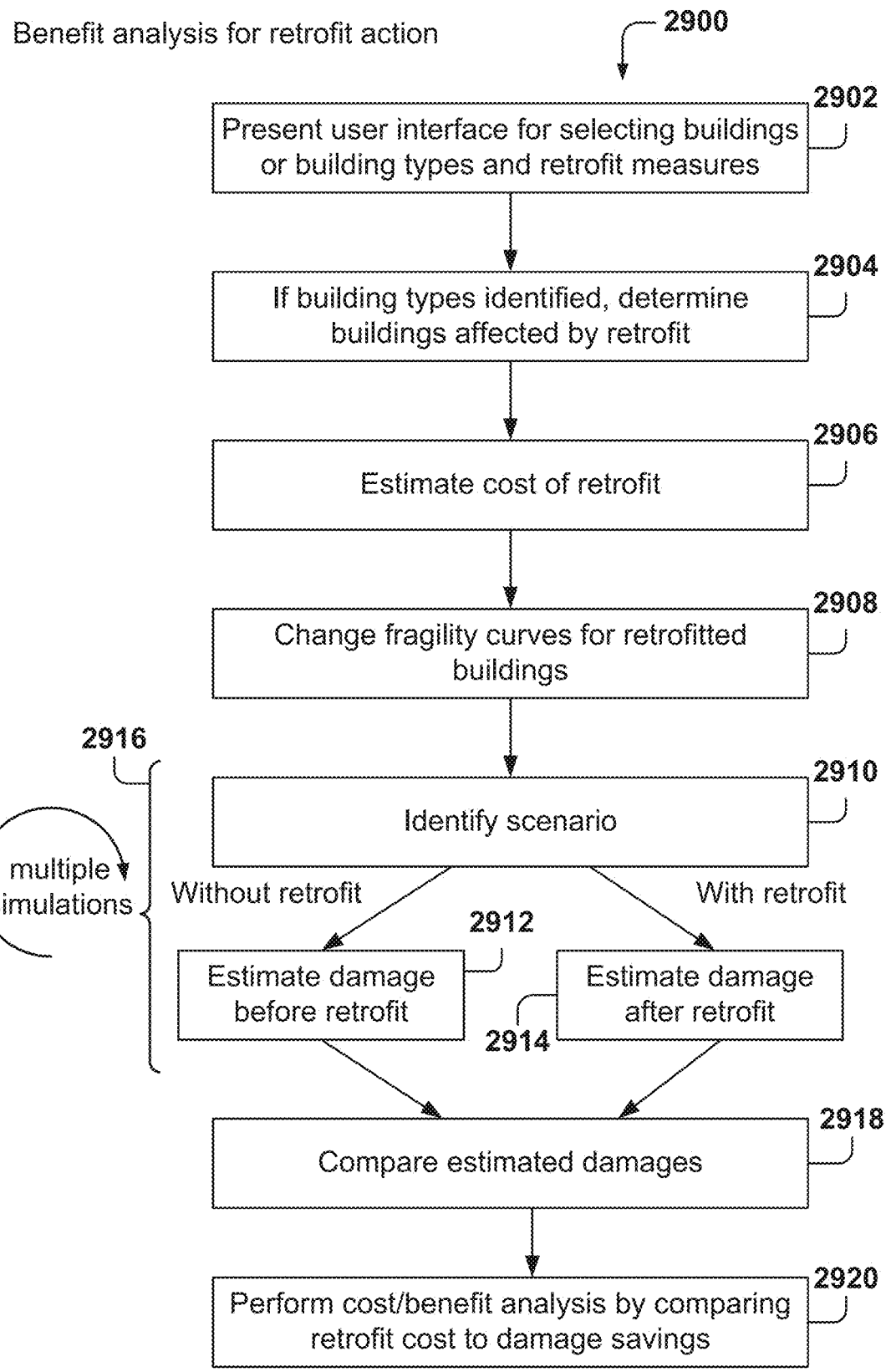
FIG. 29 is a flowchart of a method, according to some example embodiments, for determining the benefit of retrofitting a building.

FIG. 29 is a flowchart of a method 2900, according to some example embodiments, for determining the benefit of retrofitting a building. While the various operations in this flowchart are presented and described sequentially, one of ordinary skill will appreciate that some or all of the operations may be executed in a different order, be combined or omitted, or be executed in parallel.

At operation 2902, a user interface is presented with options for selecting buildings or building types, and for selecting retrofit measures to be applied to the selected buildings or building types. For example, the user interface provides options for selecting building characteristics, such as year built, construction materials, location, number of stories, etc.

In addition, the user interface provides options for selecting retrofit measures, such as different kinds of lateral bracing, changing or adding foundation bolts, options for wall bracing, etc. Additionally, the user interface may provide the user the option of entering the estimated cost of the retrofit for one building.

From operation 2902, the method 2900 flows to operation 2904, where, if building types have been identified, a determination is made regarding which buildings are included based on the selected options. If the user provides specific buildings for the analysis, then the specified buildings are those utilized for the analysis.

At operation 2906, the cost of the retrofit is estimated. However, if the user enters a cost expected for the retrofit, then the entered cost will be used in the simulation as the retrofit cost. If the user does not enter the cost, the damage-estimation program will identify an estimated cost based on experience, publicly available data, expert estimates, preconfigured cost tables, etc.

At operation 2908, the fragility curves for the retrofitted buildings are modified to produce new fragility curves, as described above with reference to FIG. 28. The program automatically shifts the "current state" (e.g., means and standard deviations of the fragility curves) of each building based on the estimated impact of the retrofit. The algorithm determines how much each "current state" is adjusted based on research data accounting for experience, and the adjustment may be different for each of the 252 building types in the model and the different kinds of retrofit measures.

Afterwards, a plurality of simulations 2916 are performed, where each simulation corresponds to a different scenario, which includes the location of the epicenter and the magnitude of the earthquake. In other example embodiments, one simulation may be performed. However, if just one simulation is performed, the data may be incomplete and not address other possible scenarios, because there can be many different levels of shaking and epicenter locations.

The USGS publishes likely scenarios for different magnitudes and different locations of earthquakes, which are the most probable scenarios for a particular area. In some example embodiments, the simulations performed are based on the estimated probable scenarios for the area provided by the USGS.

Each simulation 2916 includes operations 2910, 2912, and 2914. At operation 2910, the scenario is identified with the corresponding earthquake data. For the identified scenario, two damages are estimated: at operation 2912, the damage before the retrofit is estimated, and at operation 2914, the damage after the retrofit is estimated.

At operation 2918, the estimated damages, with and without the retrofit, for the different scenarios are compared. The data is aggregated to identify a representative value for the expected benefit caused by the retrofit. As discussed above, the data may be aggregated by calculating averages, or weighted averages based on the probability of occurrence of each scenario.

From operation 2918, the method flows to operation 2920, where the benefit/cost analysis is performed by comparing the damage differences and the retrofit expenses. One example is provided in FIG. 31 below for a benefit/cost analysis of different retrofit measures.

The program hides the complexity of estimating damages under different circumstances and provides easy-to-understand values for the decision-maker, such as cost, benefit, and where the money may be best spent. One study from FEMA indicates that one dollar spent in mitigation returns four dollars in reduced earthquake losses. For example, if a city spends $10 million in mitigation, after an earthquake the losses would be reduced by $40 million.

However, the study refers to general building losses and general mitigating measures, but other studies have indicated that if the money is spent on higher-risk buildings, the benefit ratio may be as high as 44 to 1. By better identifying risks and the estimated return on different types of mitigating measures, it is expected that that ratio may be even higher, such as 100 to 1 or more. For example, considering the case where a building may completely collapse in an earthquake, money spent on retrofits that will avert the collapse of the building would represent a high benefit/cost ratio.

Figure 30:
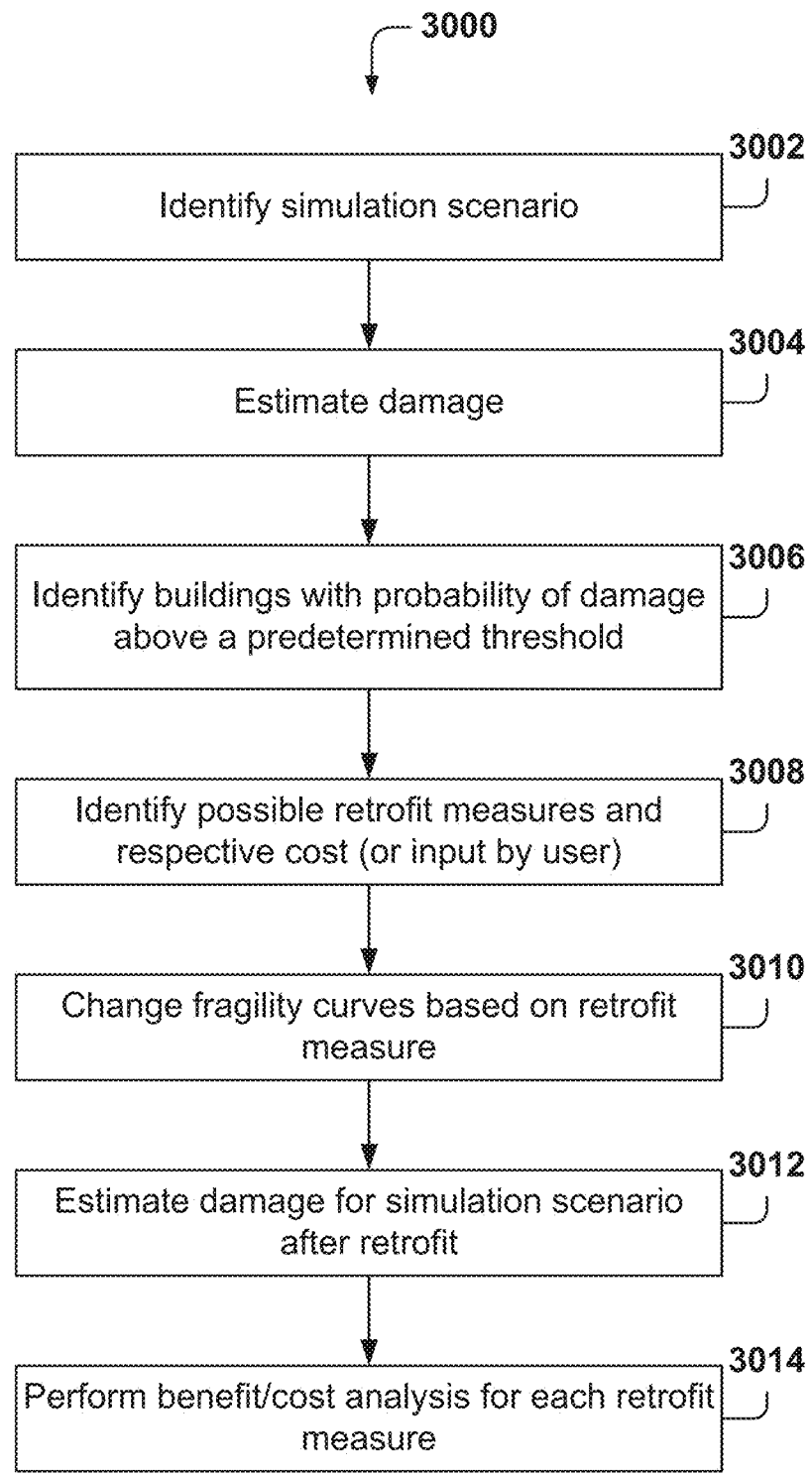
FIG. 30 is a flowchart of a method, according to some example embodiments, for determining the benefit of retrofitting a high-risk building.

FIG. 30 is a flowchart of a method 3000, according to some example embodiments, for determining the benefit of retrofitting a high-risk building. While the various operations in this flowchart are presented and described sequentially, one of ordinary skill will appreciate that some or all of the operations may be executed in a different order, be combined or omitted, or be executed in parallel.

The method 3000 of FIG. 30 is for identifying buildings with a high collapse probability and then analyzing possible retrofit scenarios for the high-risk buildings. The benefit/cost ratio of a building with a high probability of collapsing could be as high as 60 or more. However, these buildings must be identified first, and that is why simulations are performed in order to identify high-risk buildings. For example, the buildings that may come up with BDI of 3 in most simulations are identified as high risk. It is to be noted that buildings may be of high risk because of how they are built, but also because of their location or their natural environment (e.g., situated near a fault or on loose soil).

At operation 3002, one or more simulation scenarios are identified. The method 3000 is described with reference to a single simulation, but multiple simulations may be performed, as discussed above with reference to FIG. 29. The simulation scenario may include, at least, an epicenter location and a magnitude.

At operation 3004, the damage is estimated for the buildings in the region, and at operation 3006, the buildings with a probability of damage above a predetermined threshold are identified as high-risk buildings.

At operation 3008, the system identifies possible retrofit measures and the respective costs. In our example embodiments, the user may identify the retrofit measure being considered, the retrofit cost, or both.

At operation 3010, the fragility curves for the identified buildings are changed based on the identified retrofit measure or measures. In operation 3012, the damage is estimated for the identified scenario but with the identified buildings having been retrofitted.

At operation 3014, the benefit/cost analysis is performed for one or more of the retrofit measures to identify the potential benefit of each of the retrofit measures as compared to its respective cost.

Figure 31:
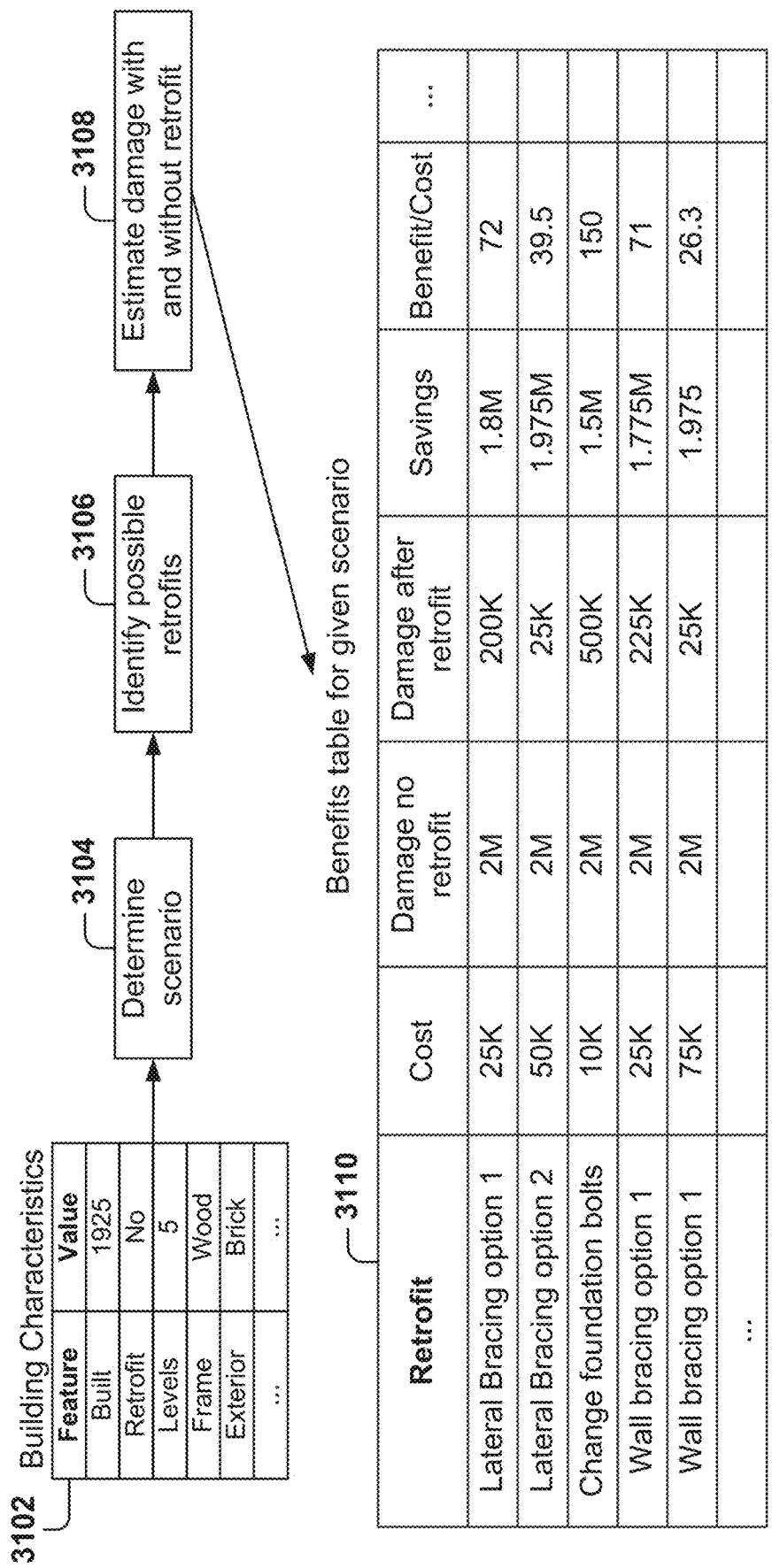
FIG. 31 illustrates a table with estimated benefits for different retrofit measures, according to some example embodiments.

FIG. 31 illustrates a table with estimated benefits for different retrofit measures, according to some example embodiments. At operation 3104, a scenario (or scenarios) are determined, and at operation 3106, possible retrofit measures are identified. At operation 3108 the damage is estimated based on building characteristics 3102, the data model, the scenario, and one of the retrofits identified.

Operation 3108 is repeated for each of the retrofit measures being considered. After all the simulations are performed, the results are presented to the user, such as via a table 3110 that displays data in each row for a different retrofit measure.

For each retrofit measure (e.g., lateral bracing option number one), the cost of performing the retrofit on the building is shown, as well as the estimated damage without retrofit (e.g., $2 million), the estimated damage after the building has been retrofitted (e.g., $200,000), the savings in damage (e.g., $1.8 million), and the benefit/cost ratio (e.g., 72).

The savings is calculated as the difference between the damage without retrofit and the damage after the building has been retrofitted. For example, if the expected damage without retrofit is $2 million and the damage after the retrofit is $200,000, the savings is equal to the difference of $1.8 million. The benefit/cost ratio is calculated as the ratio between the benefit and the cost. Therefore, if the benefit is $1.8 million and the cost is $25,000, the benefit/cost ratio is 72.

The user may scan through the table 3110 and identify the retrofit measures that would provide the highest return, such as changing the foundation bolts in the example of FIG. 31. In addition, the user may look at the best savings, such as performing lateral bracing option number two, which is more expensive than lateral bracing option number one, but will generate higher savings. Additionally, the table 3110 may show some options that are less expensive and will generate less savings, but still will be very efficient in diminishing damages. For example, changing the foundation bolts may only cost $10,000, with less savings than other options, but still providing a large savings of $1.5 million.

Further, in some scenarios, the user may select to combine two retrofitting options and then perform the simulation. For example, another entry may be created where the user selects lateral bracing option number one and a change of the foundation bolts. This is less expensive than lateral bracing option number two, but the combination may generate higher savings because of the compound retrofit measures. In summary, the benefits table provides science-based options to the policymakers to maximize the benefit of public money spent on retrofitting.

In some example embodiments, the benefit may be measured as the cost to rebuild. However, the cost to rebuild may change by region and the model will take into account weight factors based on the region.

Figure 32:
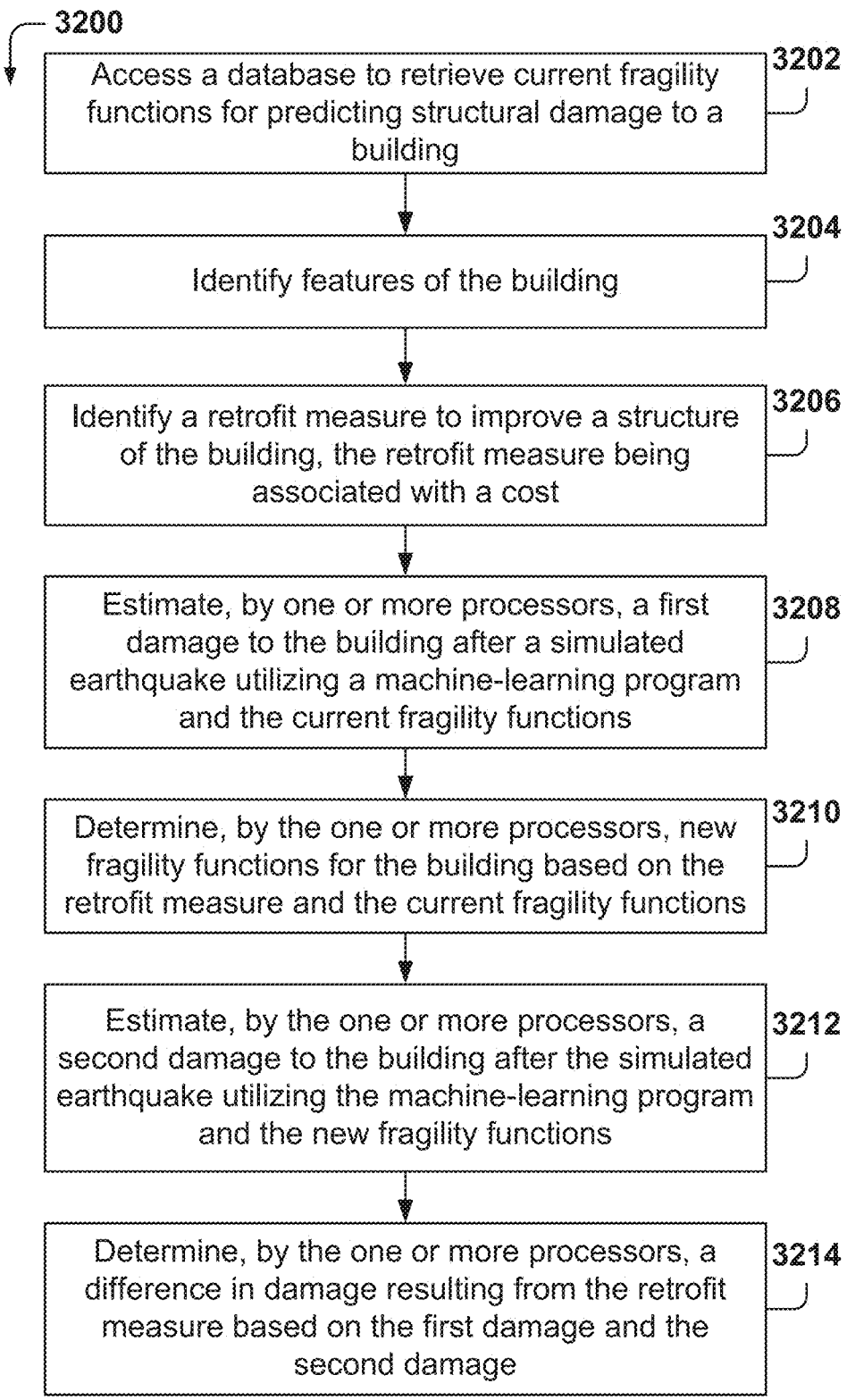
FIG. 32 is a flowchart of a method, according to some example embodiments, for estimating the differences, due to building retrofitting, in damage caused to the building by an earthquake.

FIG. 32 is a flowchart of a method 3200, according to some example embodiments, for estimating the differences, due to building retrofitting, in damage caused to the building by an earthquake. While the various operations in this flowchart are presented and described sequentially, one of ordinary skill will appreciate that some or all of the operations may be executed in a different order, be combined or omitted, or be executed in parallel.

At operation 3202, a database is accessed to retrieve current fragility functions for predicting structural damage to a building. At operation 3204, the method 3200 identifies features of the building. From operation 3204, the method 3200 flows to operation 3206 for identifying a retrofit measure to improve a structure of the building, the retrofit measure being associated with a cost.

At operation 3208, one or more processors estimate a first damage to the building after a simulated earthquake utilizing a machine-learning program and the current fragility functions. At operation 3210, the one or more processors determine new fragility functions for the building based on the retrofit measure and the current fragility functions.

From operation 3210, the method 3200 flows to operation 3212 for estimating, by the one or more processors, a second damage to the building after the simulated earthquake utilizing the machine-learning program and the new fragility functions. At operation 3214, the one or more processors determine a difference in damage resulting from the retrofit based on the first damage and the second damage.

In one aspect, the method 3200 further includes recalculating the first damage and the second damage for a plurality of scenarios of simulated earthquakes, and aggregating the first damage and the second damage from the plurality of scenarios to identify an expected benefit from the retrofit.

In some examples, the method 3200 further includes identifying, by the one or more processors using the machine-learning program, buildings in a region with a risk of collapse above a predetermined threshold after the simulated earthquake, and determining the difference in damage resulting from the retrofit for the identified buildings.

In some examples, the retrofit measure is an alteration made to a built structure that decreases a probability of damage to the built structure after an earthquake.

In some example embodiments, the current fragility function for each feature expresses a probability that the feature will suffer damage after an earthquake based on a shaking suffered by the structure caused by the earthquake.

In some examples, each current fragility function has a mean and a standard deviation, and determining each new fragility function further includes increasing the mean of the current fragility function to generate the new fragility function. In some examples, the increase of the mean of the current fragility function is based on the retrofit measure, where the new fragility function has a lower probability of damage caused by the simulated earthquake than does the current fragility function.

In some examples, the method 3200 further includes estimating damage savings for the simulated earthquake for a plurality of potential retrofit measures, and presenting the damage savings for the plurality of potential retrofit measures.

In some examples, the features are classified into built environment features, natural environment features, or instantaneous line features, where the built environment features include one or more of a structure location, a structure size, a structure price, a year in which the structure was built, a number of stories of the structure, whether the structure is commercial or residential, a building material of the structure, and a presence or absence of a chimney in the structure.

In some examples, in the method 3200, determining each new fragility function further includes assigning the new fragility function that is a combination of two or more predefined fragility functions, each predefined fragility function of the combination having a respective weight.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the present subject matter is described with reference to specific example embodiments, various modifications and changes may be made to these example embodiments without departing from the broader scope of embodiments of the present disclosure. Such example embodiments of the present subject matter may be referred to herein, individually or collectively, by the term "invention" merely for convenience and without intending to voluntarily limit the scope of this application to any single disclosure or present concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computerized method comprising:
    accessing, using one or more processors of a computer device, a plurality of features of a building and current fragility functions for the plurality of features of the building, wherein each current fragility function expresses a probability function for damage to the associated feature caused by a range of spectral accelerations caused by an earthquake;
    estimating, by the one or more processors, a first damage to the building after a simulated earthquake utilizing a machine-learning program, the machine-learning program estimating the first damage based on values of the plurality of features of the building, the current fragility functions for the features of the building, and an spectral acceleration caused by the simulated earthquake that is within the range of spectral accelerations;
    identifying a retrofit measure to improve a structure of the building, the retrofit measure being associated with a cost;
    determining, by the one or more processors, updates to values of one or more from the plurality of features of the building based on the retrofit measure;
    determining new fragility functions for the plurality of features of the building based on the retrofit measure and the current fragility functions;
    estimating, by the one or more processors, a second damage to the building after the simulated earthquake utilizing the machine-learning program, the machine-learning program estimating the second damage based on the updated values of the features of the building, the new fragility functions, and the spectral acceleration caused by the simulated earthquake; and
    determining, by the one or more processors, an effect of the retrofit measure based on an analysis of the cost of the retrofit measure, the first damage and the second damage.

2. The method as recited in claim 1, further comprising:
    recalculating, by the machine-learning program, the first damage and the second damage for a plurality of scenarios of simulated earthquakes with different epicenters and different amounts of shaking suffered by the building; and
    aggregating the first damage and the second damage from the plurality of scenarios to identify an expected benefit from the retrofit measure.

3. The method as recited in claim 1, further comprising:
    identifying, by the one or more processors using the machine-learning program, buildings in a region with a risk of collapse above a predetermined threshold after the simulated earthquake; and
    determining a difference in damage resulting from the retrofit measure for the identified buildings.

4. The method as recited in claim 1, wherein the retrofit measure is an alteration made to a built structure that decreases a probability of damage to the built structure after an earthquake.

5. The method as recited in claim 1, wherein each current fragility function has a mean and a standard deviation, wherein determining each new fragility function further comprises increasing the mean of the current fragility function to generate the new fragility function.

6. The method as recited in claim 5, wherein the increase of the mean of the current fragility function is based on the retrofit measure, wherein the new fragility function predicts a lower probability of damage caused by the simulated earthquake than does the current fragility function.

7. The method as recited in claim 1, further comprising:
    estimating damage savings for the simulated earthquake for a plurality of potential retrofit measures, and
    presenting the damage savings for the plurality of potential retrofit measures.

8. The method as recited in claim 1, wherein the features used by the machine-learning program are classified into built environment features, natural environment features, and instantaneous line features, wherein the built environment features comprise a structure location, a structure size, a structure price, a year in which the structure was built, a number of stories of the structure, whether the structure is commercial or residential, and a building material of the structure.

9. The method as recited in claim 1, wherein determining the new fragility functions further comprises:
    assigning the new fragility function that is a combination of two or more predefined fragility functions, each predefined fragility function of the combination having a respective weight.

10. A system comprising:
a memory comprising instructions; and
one or more computer processors, wherein the instructions, when executed by the one or more computer processors, cause the one or more computer processors to perform operations comprising:
  accessing a plurality of features of a building and current fragility functions for the plurality of features of the building, wherein each current fragility function expresses a probability function for damage to the associated feature caused by a range of spectral accelerations caused by an earthquake;
  estimating a first damage to the building after a simulated earthquake utilizing a machine-learning program, the machine-learning program estimating the first damage based on values of the plurality of features of the building, the current fragility functions for the features of the building and an spectral acceleration caused by the simulated earthquake that is within the range of spectral accelerations;
  identifying a retrofit measure to improve a structure of the building, the retrofit measure being associated with a cost;
  determining updates to values of one or more from the plurality of features of the building based on the retrofit measure;
  determining new fragility functions for the plurality of features of the building based on the retrofit measure and the current fragility functions;
  estimating a second damage to the building after the simulated earthquake utilizing the machine-Teaming program the machine-learning program estimating the second damage based on the updated values of the features of the building, the new fragility functions, and the spectral acceleration caused by the simulated earthquake; and
  determining an effect of the retrofit measure based on an analysis of the cost of the retrofit measure, the first damage and the second damage.

11. The system as recited in claim 10, wherein the instructions further cause the one or more computer processors to perform operations comprising:
  recalculating, by the machine-learning program, the first damage and the second damage for a plurality of scenarios of simulated earthquakes with different epicenters and different amounts of shaking suffered by the building; and
  aggregating the first damage and the second damage from the plurality of scenarios to identify an expected benefit from the retrofit measure.

12. The system as recited in claim 10, wherein the instructions further cause the one or more computer processors to perform operations comprising:
  identifying, by the machine-learning program, buildings in a region with a risk of collapse above a predetermined threshold after the simulated earthquake; and
  determining a difference in damage resulting from the retrofit measure for the identified buildings.

13. The system as recited in claim 10, wherein each current fragility function has a mean and a standard deviation, wherein determining each new fragility function further comprises increasing the mean of the current fragility function to generate the new fragility function.

14. The system as recited in claim 10, wherein the instructions further cause the one or more computer processors to perform Operations comprising:
  estimating damage savings for the simulated earthquake for a plurality of potential retrofit measures; and
  presenting the damage savings for the plurality of potential retrofit measures.

15. A non-transitory machine-readable storage medium including instructions that, when executed by a machine, cause the machine to perform operations comprising:
  accessing a plurality of features of a building and current fragility functions for the plurality of features of the building, wherein each current fragility function expresses a probability function for damage to the associated feature caused by a range of spectral accelerations caused by an earthquake;
  estimating a first damage to the building after a simulated earthquake utilizing a machine-learning program, the machine-learning program estimating the first damage based on values of the plurality of features of the building, the current fragility functions for the features of the building, and an spectral acceleration caused by the simulated earthquake at is within the range of spectral accelerations;
  identifying a retrofit measure to improve a structure of the building, the retrofit measure being associated with a cost;
  determining updates to values of one or more from the plurality of features of the building based on the retrofit measure;
  determining new fragility functions for the features of the building based on the retrofit measure and the current fragility functions;
  estimating a second damage to the building after the simulated earthquake utilizing the machine-learning program, the machine-learning program estimating the second damage based on the updated values of the features of the building, the new fragility functions, and the spectral acceleration caused by the simulated earthquake; and
  determining an effect of the retrofit measure based on an analysis of the cost of the retrofit measure, the first damage and the second damage.

16. The machine-readable storage medium as recited in claim 15, wherein the machine further performs operations comprising:
  recalculating, by the machine-learning program, the first damage and the second damage for a plurality of scenarios of simulated earthquakes with different epicenters and different amounts of shaking suffered by the building; and
  aggregating the first damage and the second damage from the plurality of scenarios to identify an expected benefit from the retrofit measure.

17. The machine-readable storage medium as recited in claim 15, wherein the machine further performs operations comprising:
  identifying, by the machine-learning program, buildings in a region with a risk of collapse above a predetermined threshold after the simulated earthquake; and
  determining a difference in damage resulting from the retrofit measure for the identified buildings.

18. The machine-readable storage medium as recited in claim 15, wherein each current fragility function has a mean and a standard deviation, wherein determining each new fragility function further comprises increasing the mean of the current fragility function to generate the new fragility function.

19. The machine-readable storage medium as recited in claim 15, wherein the machine further performs operations comprising:
- estimating damage savings for the simulated earthquake for a plurality of potential retrofit measures; and
- presenting the damage savings for the plurality of potential retrofit measures.

20. The system as recited in claim 10, wherein determining the new fragility functions further comprises:
- assigning the new fragility function that is a combination of two or more predefined fragility functions, each predefined fragility function of the combination having a respective weight.

\* \* \* \* \*